US012123575B2

(12) United States Patent
Senofsky

(10) Patent No.: US 12,123,575 B2
(45) Date of Patent: Oct. 22, 2024

(54) MODULAR MUD-IN CHANNEL LIGHTING SYSTEM

(71) Applicant: LED Inspirations LLC, Houston, TX (US)

(72) Inventor: Nicholas William Senofsky, Cypress, TX (US)

(73) Assignee: LED INSPIRATIONS LLC, Houston, TX (US)

( * ) Notice: Subject to any disclaimer, the term of this patent is extended or adjusted under 35 U.S.C. 154(b) by 0 days.

(21) Appl. No.: 18/433,106

(22) Filed: Feb. 5, 2024

(65) Prior Publication Data

US 2024/0263763 A1 Aug. 8, 2024

Related U.S. Application Data

(60) Provisional application No. 63/443,783, filed on Feb. 7, 2023.

(51) Int. Cl.

| | |
|---|---|
| ***F21V 15/015*** | (2006.01) |
| ***F21V 3/00*** | (2015.01) |
| *F21V 21/04* | (2006.01) |

(52) U.S. Cl.
CPC .............. *F21V 15/015* (2013.01); *F21V 3/00* (2013.01); *F21V 21/041* (2013.01); *F21V 21/047* (2013.01)

(58) Field of Classification Search
CPC .......... F21V 15/015; F21V 3/00; F21V 15/01; F21V 15/00; F21V 21/04; F21V 21/041; F21V 21/047; F21S 4/00; F21S 4/20; F21S 4/28; F21S 8/00; F21S 8/02; F21S 8/024; F21S 8/026; F21Y 2115/10
See application file for complete search history.

(56) References Cited

U.S. PATENT DOCUMENTS

| | | | | |
|---|---|---|---|---|
| 5,045,981 | A * | 9/1991 | Nagano | F21V 19/0005 362/147 |
| 9,574,751 | B1 * | 2/2017 | Eubanks | F21V 23/003 |
| 2019/0316765 | A1 * | 10/2019 | Lin | F21V 23/06 |

* cited by examiner

*Primary Examiner* — Bao Q Truong
(74) *Attorney, Agent, or Firm* — Basil M. Angelo; ANGELO IP

(57) ABSTRACT

A modular mud-in channel lighting system includes a modular channel and a modular connection box that is removably attached to the modular channel itself. Because the modular connection box is removably attached to the modular channel, a modular mud-in channel lighting system enables the creative installation of lighting solutions in a manner that is not constrained by framing or the location of pre-existing junction boxes. Further, a modular mud-in channel lighting system may be disposed at creative angles that are not limited to locations near to pre-existing junction boxes. As such, a modular mud-in channel lighting system is suitable for new construction as well as retrofits and remodels of existing construction and enables the installation of creative lighting solutions at aesthetic angles that are not possible with the limitations of conventional lighting solutions.

20 Claims, 32 Drawing Sheets

100

100

110

200

200

300

300

300

300

300

300

600

600

600

600

600

600

MODULAR MUD-IN CHANNEL LIGHTING SYSTEM

CROSS-REFERENCE TO RELATED APPLICATIONS

This application claims the benefit of, or priority to, U.S. Provisional Patent Application 63/443,783, filed on Feb. 7, 2023, which is hereby incorporated by reference in its entirety.

BACKGROUND OF THE INVENTION

Mud-in channel refers generally to a lighting system that is disposed within wall or ceiling structures during construction to give the appearance of seamless integration with the structure. Conventional mud-in channel lighting systems include a recessed channel that is formed in the drywall in a location and at an orientation that is dictated by the location of the studs or joists and the nearest junction box. Lighting, typically Light-Emitting Diode ("LED") strip lighting, is disposed within the recessed channel and then drywall mud is applied to create the appearance of seamless integration between the lighting system and the structure.

SUMMARY OF THE INVENTION

According to one aspect of one or more embodiments of the present invention, a modular mud-in channel lighting system includes a modular channel having a base portion, a first sidewall portion, and a second sidewall portion. The first sidewall portion includes a first assembly rail and a first mounting wing, and the second sidewall portion includes a second assembly rail and a second mounting wing. The system includes a modular connection box having a base portion having a wiring port, a first sidewall portion having a first joiner positioner and a first box joiner, and a second sidewall portion having a second joiner positioner and a second box joiner. The modular connection box is removably attached to a bottom side of the modular channel by sliding the first and the second box joiners of the modular connection box into the first and second assembly rails of the modular channel.

According to one aspect of one or more embodiments of the present invention, a method of installing a modular mud-in channel lighting system includes assembling the modular mud-in channel lighting system, where the modular mud-in channel lighting system includes at least one modular channel, at least one modular connection box, and at least one modular end cap, cutting a rectangular cutout in a drywall structure, where the cutout has a width approximately equal to a width of a base portion of the at least one modular channel and a length approximately equal to a length of the base portion of the at least one modular channel, skinning a portion of a facing surface sheet of the drywall structure surrounding the cutout, where the skinned portion has a width approximately equal to a width of a first mounting wing and a second mounting wing of the at least one modular channel, securing at least one drywall mounts to a rear surface sheet portion of the drywall structure, wherein the one or more drywall mounts traverse at least the width of the cutout, and disposing the assembled modular mud-in channel lighting system in the cutout, where the first mounting wing and second mounting wing of the at least one modular channel is disposed over the skinned portion of the facing surface sheet portion of the drywall structure.

Other aspects of the present invention will be apparent from the following description and claims.

BRIEF DESCRIPTION OF THE DRAWINGS

FIG. 1I shows a top-facing exploded perspective view of the modular mud-in channel lighting system in accordance with one or more embodiments of the present invention.

DETAILED DESCRIPTION OF THE INVENTION

Figure 1A:
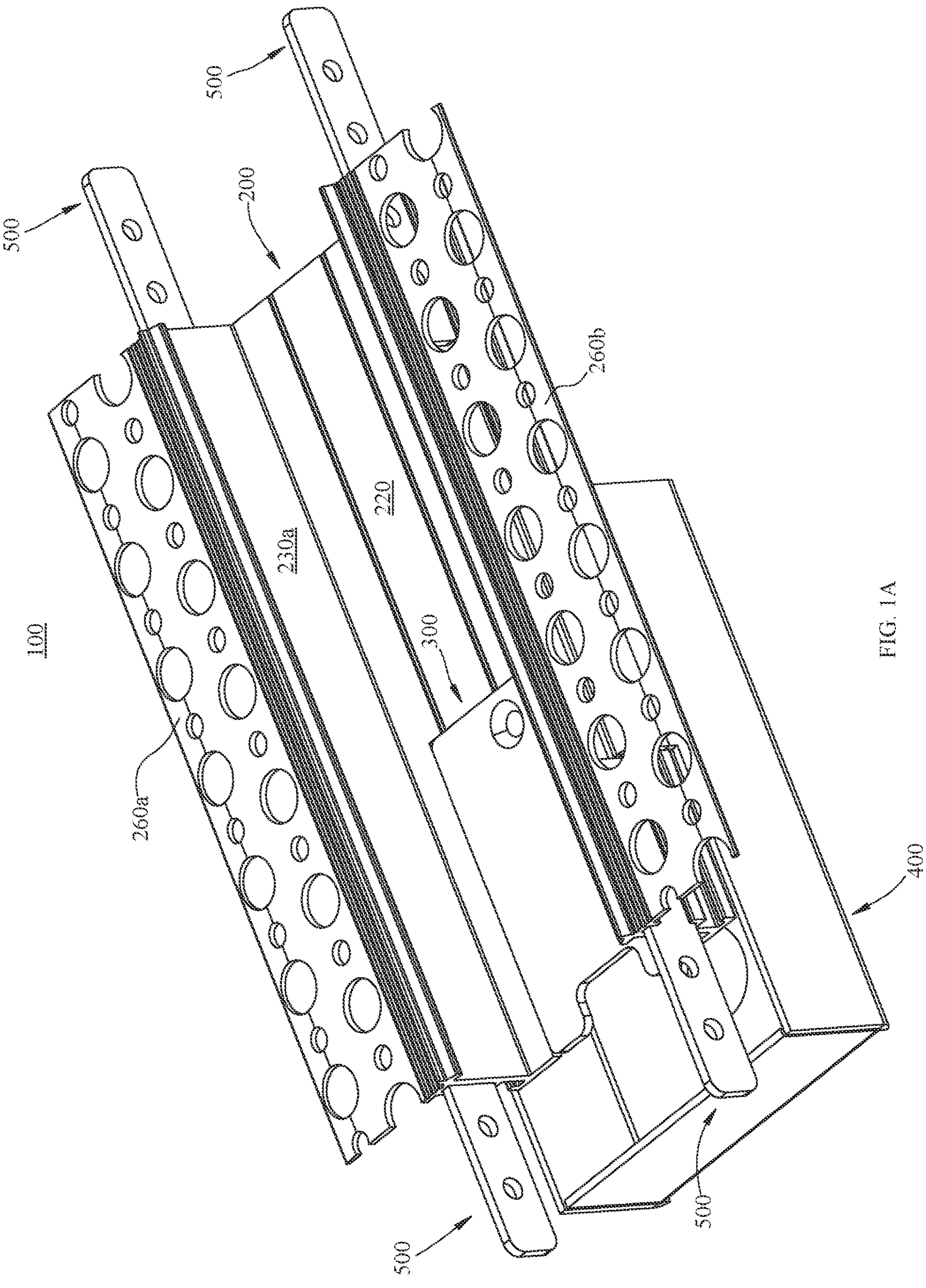
FIG. 1A shows a top-facing perspective view of a modular mud-in channel lighting system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

Drywall is a construction material that is commonly used to create walls and ceiling structures on the interior of residential and commercial buildings. Drywall includes an outwardly facing surface sheet typically composed of thick and somewhat rigid paper, an interior portion typically composed of gypsum plaster, and a hidden rear surface sheet also composed of thick paper. Drywall is sometimes referred to as plasterboard, wallboard, gypsum board, gyprock, and by U.S. Gypsum Company's commercial tradename, Sheetrock®. During new construction of the interior of a residential or commercial building, the wall or ceiling structure is framed with studs or joists that are typically disposed every 16 inches on center from one another. Once framed, the electrical contractor will run electrical conduit to a junction box that is fastened to a stud or joist for the purposes of providing access to electrical wiring prior to drywall installation. Drywall, typically in panels, are then secured to the studs or joists and the drywall is cut to allow for the installation of outlets, switches, and sometimes lighting solutions. Prior to painting, the drywall is finished by mudding, sanding, and sometimes texturizing the facing surface sheet of the drywall.

A substantial limitation to the installation of conventional mud-in channel lighting systems is that they require access to a pre-installed junction box that, in combination with physical constraints of the framing, constrain the location and angle of orientation of the lighting installation. As noted above, framing typically includes the disposition of vertically oriented studs or joists that are disposed a certain distance from one another. Further, the location of a junction box is typically dictated by the framing of the studs or joists and the fact that the junction box itself must be fastened to a stud or joist. The installation of a lighting solution is constrained by the fact that it must be mounted to a junction box, not necessarily at desirable locations, that is fastened to a stud or joist that limits the angle of orientation, typically to parallel to the floor. As such, conventional mud-in channel lighting systems can only be installed parallel to the floor and near a pre-existing junction box on which it must be physically mounted. Thus, conventional mud-in channel lighting systems may only be installed as part of new construction and are not suitable for retrofits or remodels of existing structures. Further, conventional mud-in channel lighting systems do not allow for the installation of unique and creative lighting solutions disposed at angles other than parallel to the floor.

Accordingly, in one or more embodiments of the present invention, a modular mud-in channel lighting system includes a modular channel and a modular connection box that is removably attached to the modular channel itself, with no requirement of proximity to a pre-existing junction box. Because the modular connection box is removably attached to the modular channel, a modular mud-in channel lighting system enables the installation of unique and creative lighting solutions in a manner that is not constrained by framing or the location of pre-existing junction boxes. Further, a modular mud-in channel lighting system may be disposed at angles that are not limited to locations near to pre-existing junction boxes. Advantageously, a modular mud-in channel lighting system is suitable for new construction as well as retrofits and remodels of existing construction and enables the installation of creative lighting solutions at aesthetic angles that are not possible with the limitations of conventional lighting solutions. Further, the modularity of a modular mud-in channel lighting system permits the creation of unique lighting solutions with modular components suitable for a given application or design.

FIG. 1A shows a top-facing perspective view of modular mud-in channel lighting system 100 in accordance with one or more embodiments of the present invention. Modular mud-in channel lighting system 100 may include modular channel 200, optional removably attached trap door 300, removably attached modular connection box 400, and, if configured for use with one or more additional modular channel pieces (e.g., 200), a plurality of modular joiners 500 that may be removably attached to modular channel 200. Modular channel 200 may include a base portion 220, a first sidewall portion 230*a*, and a second sidewall portion (not independently illustrated). First sidewall portion 230*a* may include a first assembly rail (not shown) and a first mounting wing 260*a*. Second sidewall portion (not independently illustrated) may include a second assembly rail (not independently illustrated) and a second mounting wing 260*b*. First mounting wing 260*a* and second mounting wing 260*b* may span the longitudinal length of modular channel 200 and may be used to mount and secure modular mud-in lighting system 100 to drywall (not shown) as discussed in more detail herein. Advantageously, the modularity of modular mud-in channel lighting system 100 permits the custom configuration and installation of a unique lighting solution for a given application or design.

Figure 1B:
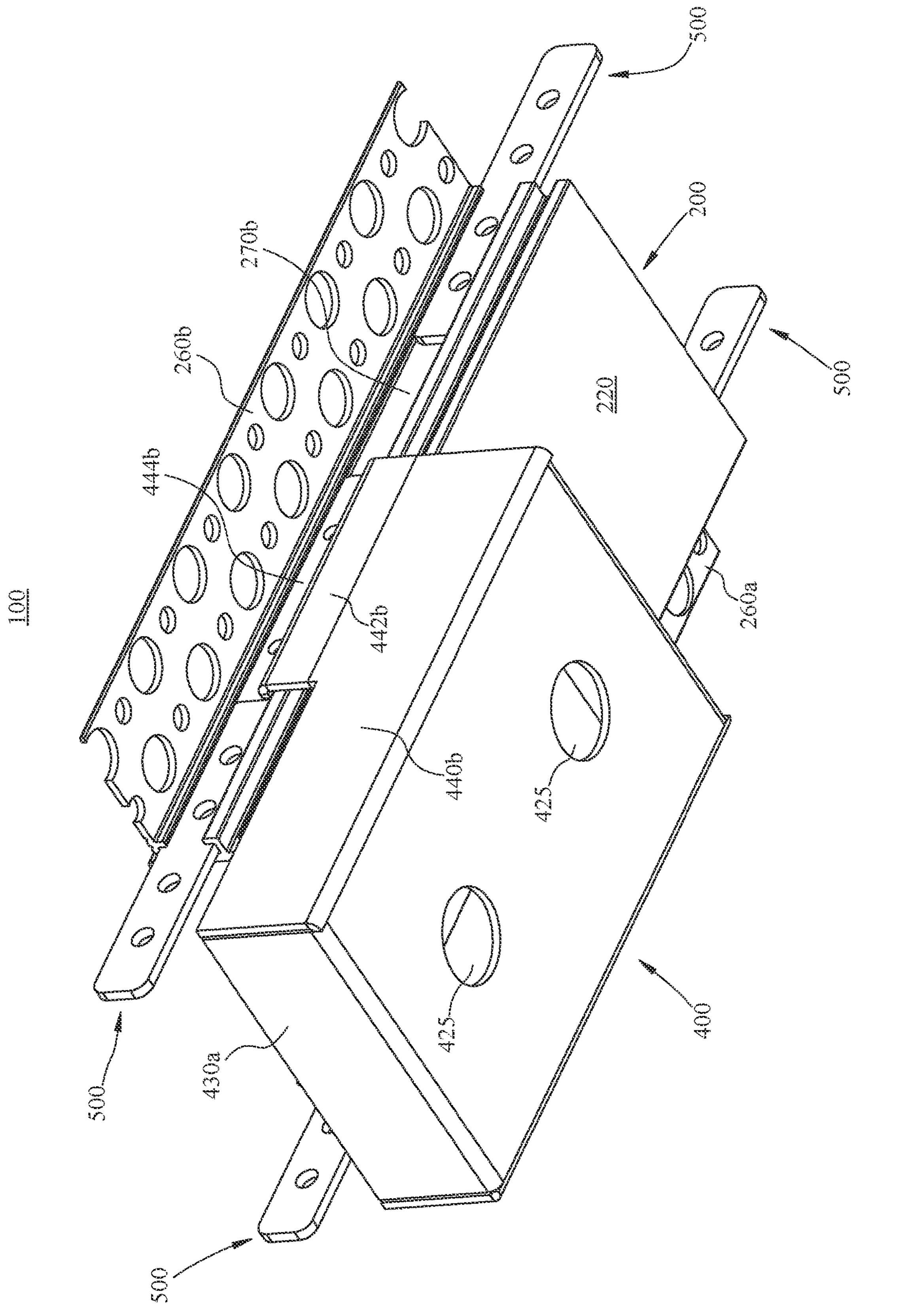
FIG. 1B shows a bottom-facing perspective view of the modular mud-in channel lighting system in accordance with one or more embodiments of the present invention.

Continuing, FIG. 1B shows a bottom-facing perspective view of modular mud-in channel lighting system 100 in accordance with one or more embodiments of the present invention. Modular mud-in channel lighting system 100 may include modular connection box 400 that is removably attached to modular channel 200. As shown in this view, modular connection box 400 includes at least one wiring port 425, a first sidewall portion (not shown) having a first joiner positioner (not shown) that positions a first box joiner (not shown) and a second sidewall portion 440*b* having second joiner positioner 442*b* that positions second box joiner 444*b*. The at least one wiring port 425 permits the introduction of wiring (not shown) from within the drywall (not shown) into an interior area of modular connection box 400 for connectivity. First (not shown) and second 442*b* joiner positioners position their respective first (not shown) and second 444*b* box joiners that may be removably disposed within a first assembly rail (not shown) and a second assembly rail 270*b* of modular channel 200. Because modular connection box 400 may be removably attached to modular channel 200, modular mud-in channel lighting system 100 does not have to be placed such that it can attach to a pre-existing junction box (not shown), thereby enabling the installation of unique and creative lighting solutions.

Figure 1C:
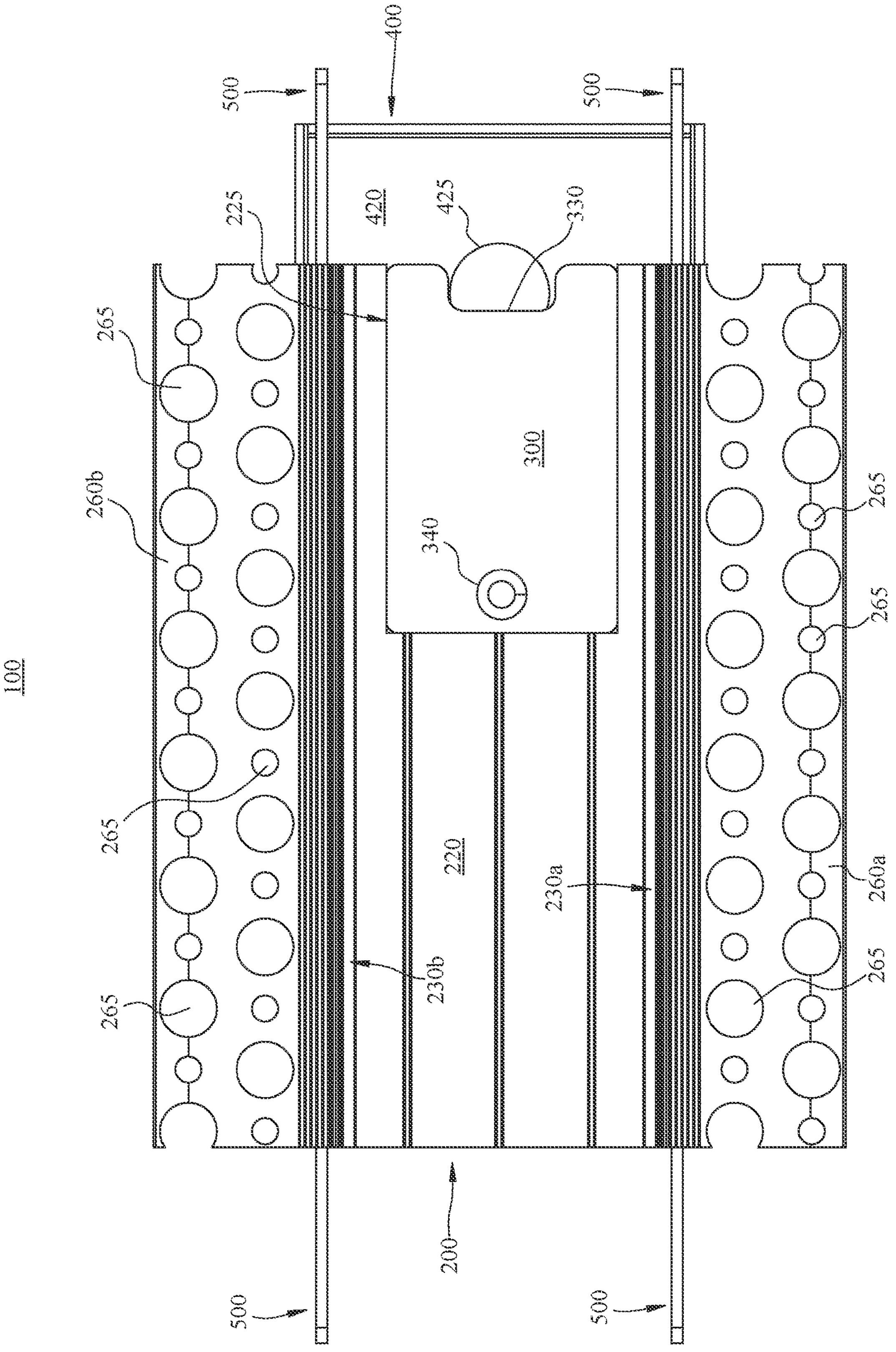
FIG. 1C shows a top plan view of the modular mud-in channel lighting system in accordance with one or more embodiments of the present invention.
Figure 1D:
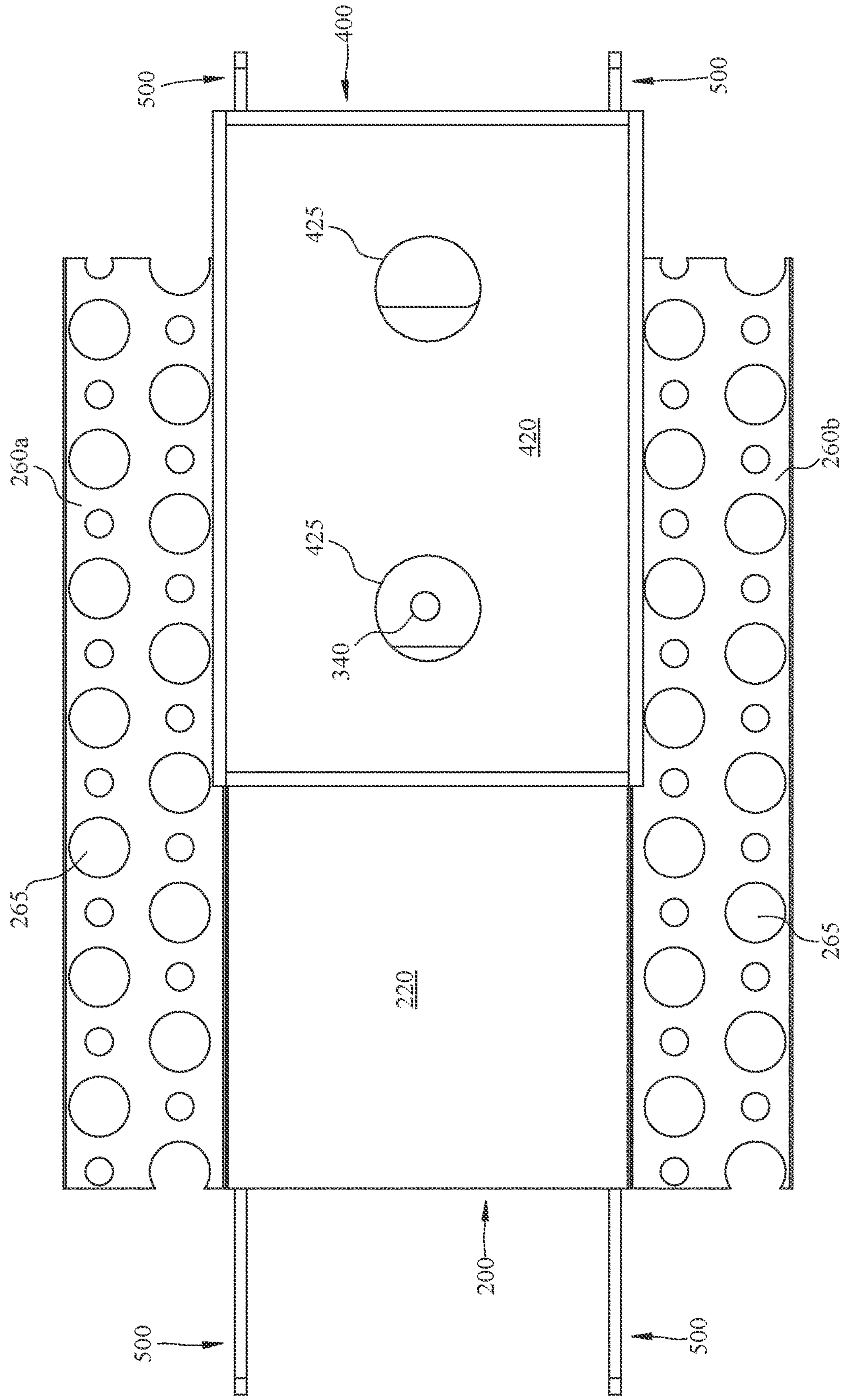
FIG. 1D shows a bottom plan view of the modular mud-in channel lighting system in accordance with one or more embodiments of the present invention.

Continuing, FIG. 1C shows a top plan view of modular mud-in channel lighting system 100 in accordance with one or more embodiments of the present invention. Modular channel 200 may include recessed base portion 220 where LED strip lighting (not shown) may be disposed. Optional removably attached trap door 300 may be removed during installation of the LED strip lighting (not shown) to facilitate the connection between an LED power connector (not shown) for the LED strip lighting (not shown) and a wiring harness (not shown) brought in through the at least one wiring port 425 of modular connection box 400 and, once inserted, used for the placement of LED strip lighting (not shown). In addition, optional trap door 300 provides access to the internal area of modular connection box 400 for maintenance and service of the lighting system. Once connectivity is established, removably attached trap door 300 may be re-inserted into a trap door receiver 225 of modular channel 200 to allow for the placement of the LED strip lighting (not shown) in a manner that spans up to the length of modular channel 200. First mounting wing 260*a* and second mounting wing 260*b* may each include a plurality of mounting holes 265 that may be used to mount and secure modular mud-in lighting system 100 to drywall (not shown) as discussed in more detail herein in addition to enhancing attachment during mud-in. As shown in this view, a plurality of modular joiners 500 may be used to removably connect additional modular channels (e.g., 200) if necessary to achieve a desired length of lighting. Continuing, FIG. 1D shows a bottom plan view of modular mud-in channel lighting system 100 in accordance with one or more embodiments of the present invention. Modular connection box 400 may include at least one wiring port 425 that permits the routing of wiring (not shown) from within the drywall (not shown) into an interior area of modular connection box 400 for connectivity to the LED strip lighting (not shown).

Figure 1E:
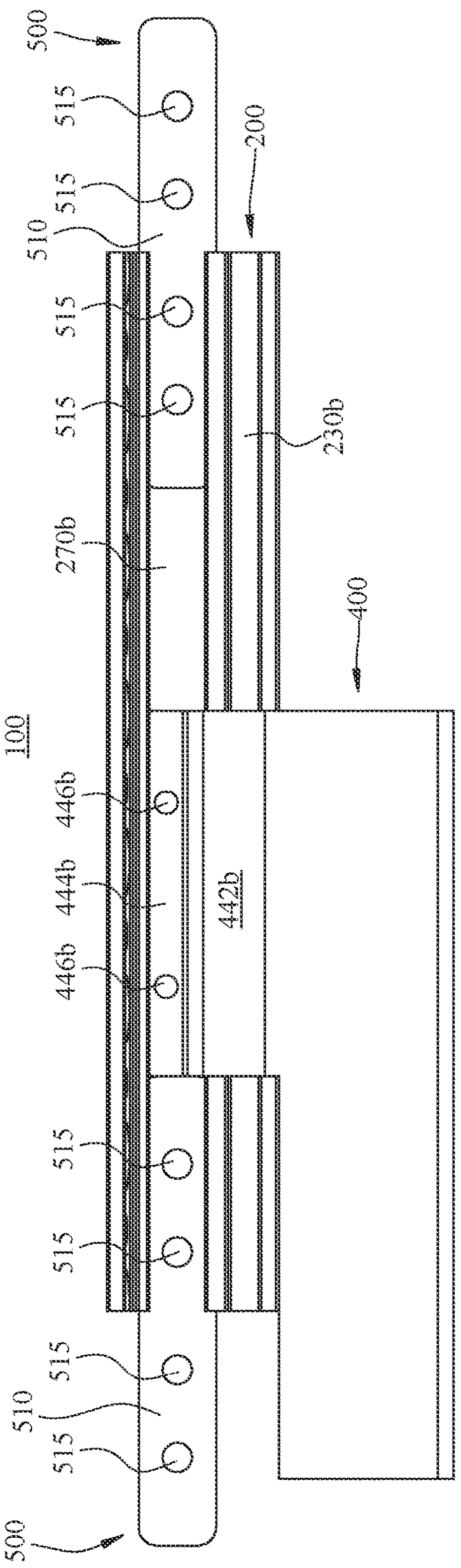
FIG. 1E shows a left elevation view of the modular mud-in channel lighting system in accordance with one or more embodiments of the present invention.
Figure 1F:
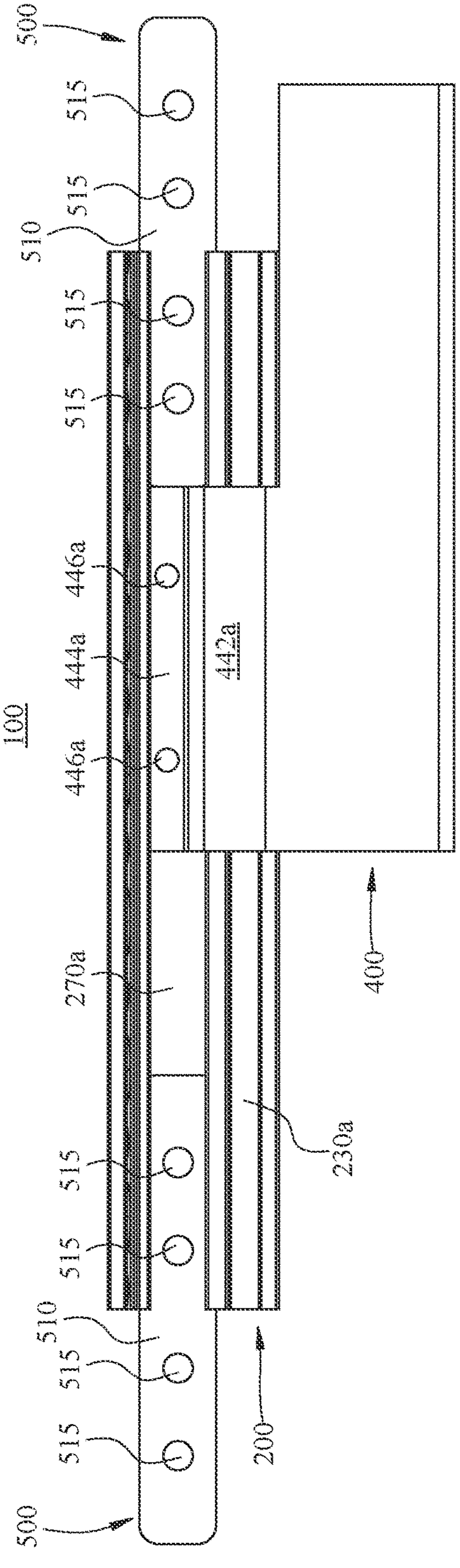
FIG. 1F shows a right elevation view of the modular mud-in channel lighting system in accordance with one or more embodiments of the present invention.

Continuing, FIG. 1E shows a left elevation view of modular mud-in channel lighting system 100 in accordance with one or more embodiments of the present invention. In this view, the removable attachment of modular connection box 400 to modular channel 200 is more clearly shown. Second joiner positioner 442*b* positions second box joiner 444*b* such that it may slide into second assembly rail 270*b* formed in an outwardly facing second sidewall portion 230*b* of modular channel 200. In embodiments where additional modular channels (e.g., 200) are desired to be removably attached to modular channel 200, a plurality of modular joiners 500 may also slide into second assembly rail 270*b*. While not shown, once second box joiner 444*b* and optional modular joiners 500 are placed within second assembly rail 270*b*, set screws (not shown) may be used to secure them in place. Continuing, FIG. 1F shows a right elevation view of modular mud-in channel lighting system 100 in accordance with one or more embodiments of the present invention. First joiner positioner 442*a* may position first box joiner 444*a* such that it may slide into first assembly rail 270*a* formed in an outwardly facing first sidewall portion 230*a* of modular channel 200. In embodiments where additional modular channels (e.g., 200) may be removably attached to modular channel 200, a plurality of modular joiners 500 may also slide into first assembly rail 270*a*. While not shown, once first box joiner 444*a* and optional modular joiners 500 are placed within first assembly rail 270*a*, set screws (not shown) may be used to secure them in place. Advantageously, modular connection box 400 may be removably attached to modular channel 200 without requiring connection to, or consideration of, the stud, joist, or pre-existing junction box (not shown). One of ordinary skill in the art, having the benefit of this disclosure, will recognize that, while first 270*a* and second 270*b* assembly rails are shown formed in outwardly facing portions of first 230*a* and second 230*b* sidewall portions, such assembly rails 270*a*, 270*b* could be formed on inwardly facing portions of first 230*a* and second 230*b* sidewall portions in accordance with one or more embodiments of the present invention.

Figure 1G:
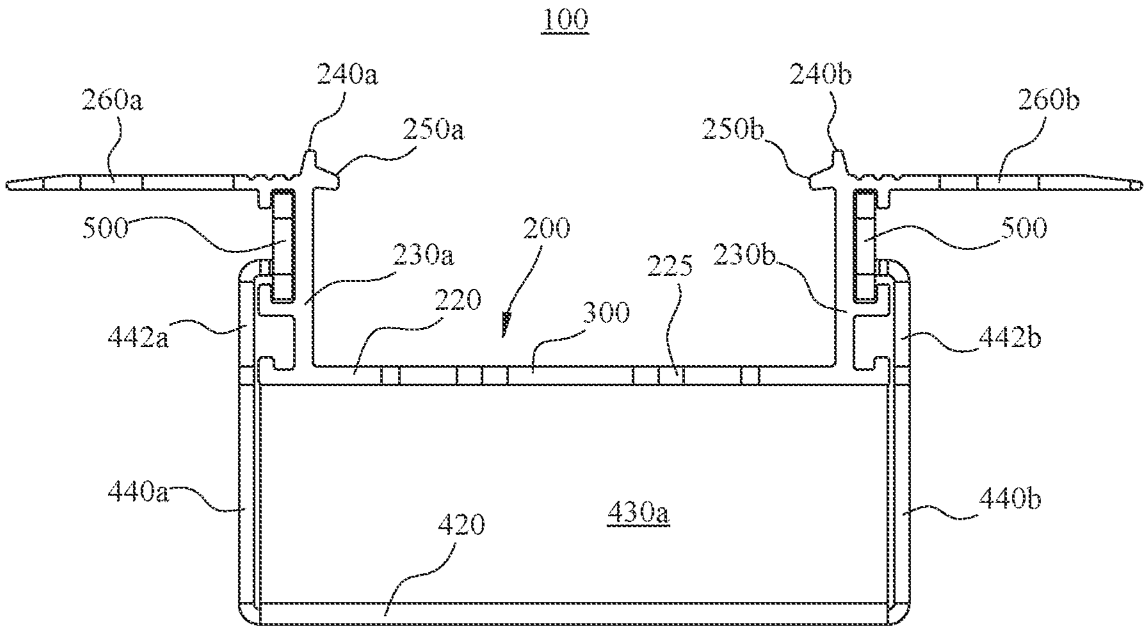
FIG. 1G shows a front elevation view of the modular mud-in channel lighting system in accordance with one or more embodiments of the present invention.

Continuing, FIG. 1G shows a front elevation view of modular mud-in channel lighting system 100 in accordance with one or more embodiments of the present invention. Modular channel 200 may include a base portion 220, a first sidewall portion 230*a*, and a second sidewall portion 230*b*. Base portion 220 may include an optional trap door receiver 225 that receives an optional removably attached trap door 300. First sidewall portion 230*a* may include first mud-in protection feature 240*a*, first diffuser retention feature 250*a*, and first mounting wing 260*a*. Similarly, second sidewall portion 230*b* may include second mud-in protection feature 240*b*, second diffuser retention feature 250*b*, and second mounting wing 260*b*. In certain embodiments, first mounting wing 260*a* and second mounting wing 260*b* may be perpendicular to first sidewall portion 230*a* and second sidewall portion 230*b*. In other embodiments, first mounting wing 260*a* and second mounting wing 260*b* may be disposed at obtuse angles relative to first sidewall portion 230*a* and second sidewall portion 230*b* such that base portion 220 of modular channel 200 may be narrower than shown. In other embodiments, first mounting wing 260*a* and second mounting wing 260*b* may be disposed at acute angles relative to first sidewall portion 230*a* and second sidewall portion 230*b* such that base portion 220 of modular channel 200 may be wider than shown. During installation, modular mud-in channel lighting system 100 may be disposed in a cutout (not shown) of drywall (not shown) such that first mounting wing 260*a* and second mounting wing 260*b* may be disposed on a skinned portion (not shown) of a facing surface sheet (not shown) of drywall (not shown) surrounding the cutout, prior to finishing (e.g., taping, mudding in, sanding, texturizing, and/or painting). First mud-in protection feature 240*a* and second mud-in protection feature 240*b* may prevent build up from finishing to exceed a predetermined level such that the modular mud-in lighting system (e.g., 100) may be disposed within the drywall (not shown) in a flush manner. As previously discussed, the LED strip lighting (not shown) may be disposed on base portion 220 of modular channel 200 with the light directed out the open end of modular channel 200. A diffuser (not shown) that diffuses the light from the LED strip lighting (not shown) may be secured in place by first diffuser retention feature 250*a* and second diffuser retention feature 250*b*, such that the diffuser (not shown) may be flush with the top of first 240*a* and second 240*b* mud-in protection features and the built up finish (not shown) of the drywall (not shown), thereby creating the impression of seamless integration.

Figure 1H:
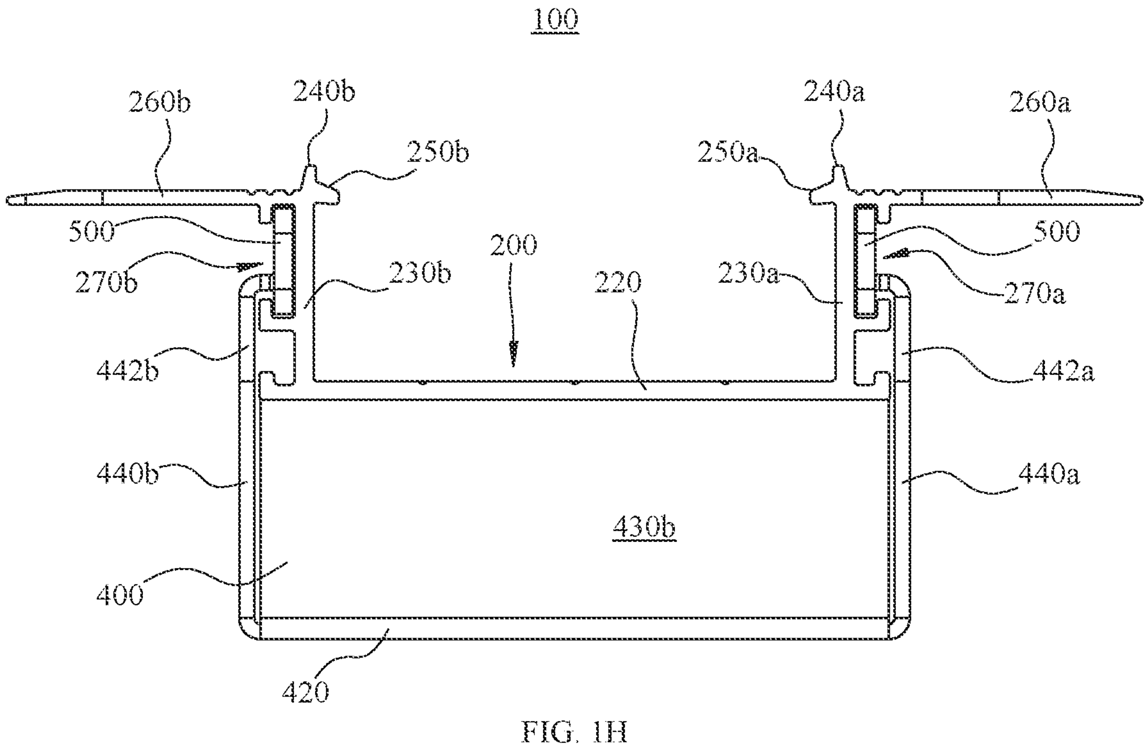
FIG. 1H shows a rear elevation view of the modular mud-in channel lighting system in accordance with one or more embodiments of the present invention.
Figure 11:
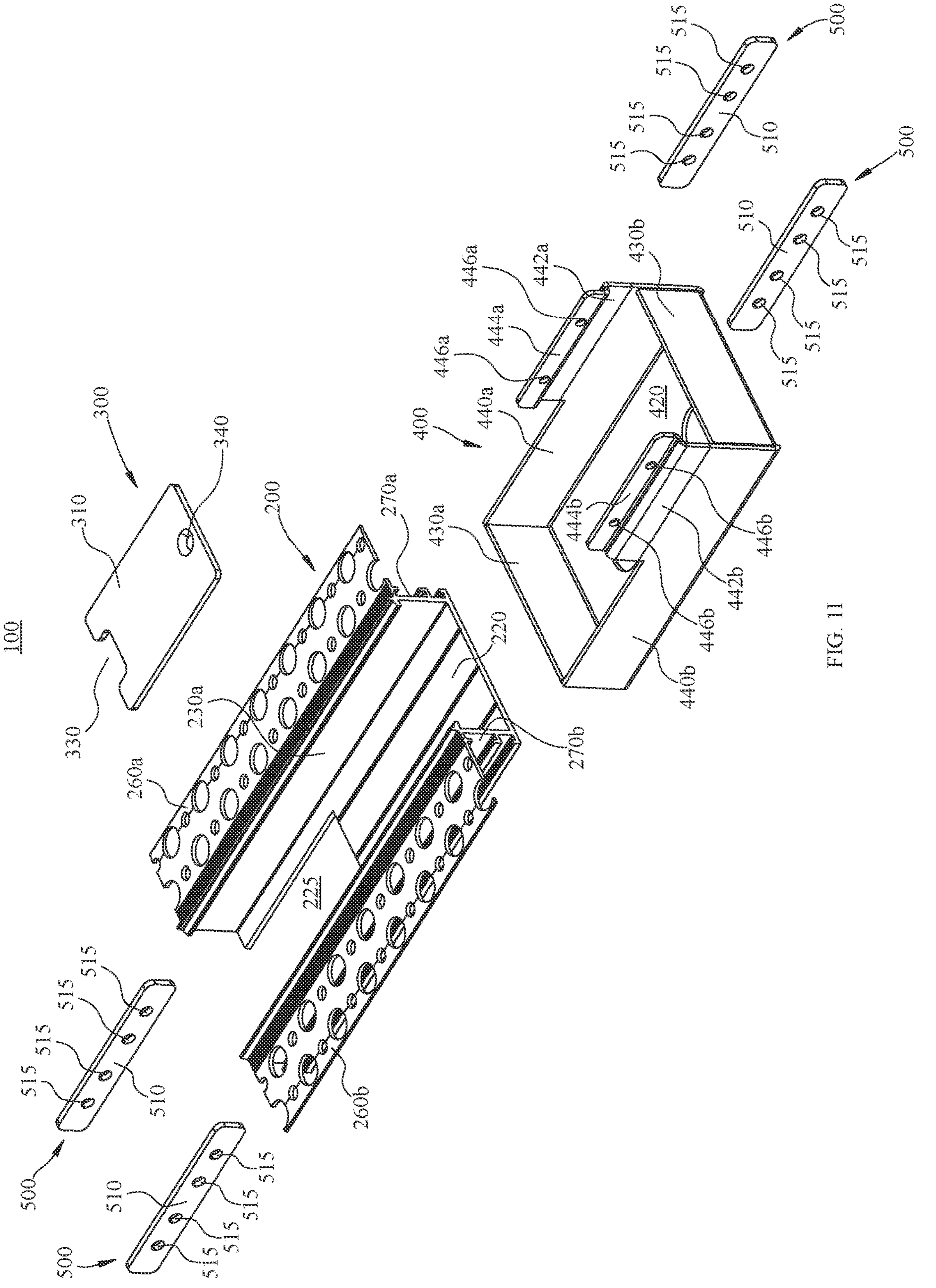

Continuing, FIG. 1H shows a rear elevation view of modular mud-in channel lighting system 100 in accordance with one or more embodiments of the present invention. Modular connection box 400 may include base portion 420, first end wall portion (e.g., 430*a* of FIG. 1G), first sidewall portion 440*a*, second end wall portion 430*b*, and second sidewall portion 440*b*. Modular connection box 400 may also include first joiner positioner 442*a* that positions first box joiner 444*a* and second joiner positioner 442*b* that positions second box joiner 444*b*. Modular connection box 400 may be removably attached to modular channel 200 by sliding first box joiner 444*a* an second box joiner 444*b* into first assembly rail 270*a* and second assembly rail 270*b* respectively of modular channel 200. Once modular connection box 400 is positioned in a desired location relative to modular channel 200, it may be secured in place by set screws (not shown). In the partial configuration shown, a plurality of modular joiners 500 may be at least partially disposed within first assembly rail 270*a* and second assembly rail 270*b*, with the remaining portions available to attach additional modular channels (e.g., 200) if necessary to achieve a desired length. While modular connection box 400 does not include a top portion opposite of base portion 420, once removably attached to modular channel 200, base portion 220 of modular channel 200 covers a substantial part of the open top of modular connection box 400, with the removable trap door (not shown) providing easy access to the interior of modular connection box 400.

Continuing, FIG. 1I shows a top-facing exploded perspective view of modular mud-in channel lighting system 100 in accordance with one or more embodiments of the present invention. For purposes of illustration only, modular connection box 400 may be removably attached to modular channel 200 by sliding first box joiner 444*a* and second box joiner 444*b* into first assembly rail 270*a* and second assembly rail 270*b* respectively. Once modular connection box 400 is set in a desired location, set screws (not shown) may be set in mounting holes 446*a* and 446*b* to secure modular connection box 400 in place. On the front side of modular channel 200, a plurality of joiners 500 may be at least partially disposed within first assembly rail 270*a* and second assembly rail 270*b* of modular channel 200, with the exposed portions available for removable attachment to an additional modular channel (e.g., 200), should it be necessary to achieve a desired length. On a rear side of modular channel 200, a plurality of joiners 500 may be at least partially disposed within first assembly rail 270*a* and second assembly rail 270*b* of modular channel 200, with the exposed portions available for removable attachment to an additional modular channel (e.g., 200), should it be necessary to achieve a desired length. Removably attached trap door 300 may be removably disposed in trap door receiver 225 of modular channel 200. One of ordinary skill in the art will appreciate that the modular mud-in channel lighting system 100 depicted is merely for purposes of illustration as the inherent modularity allows for the creation of unique lighting solutions for a given application or design.

Figure 2A:
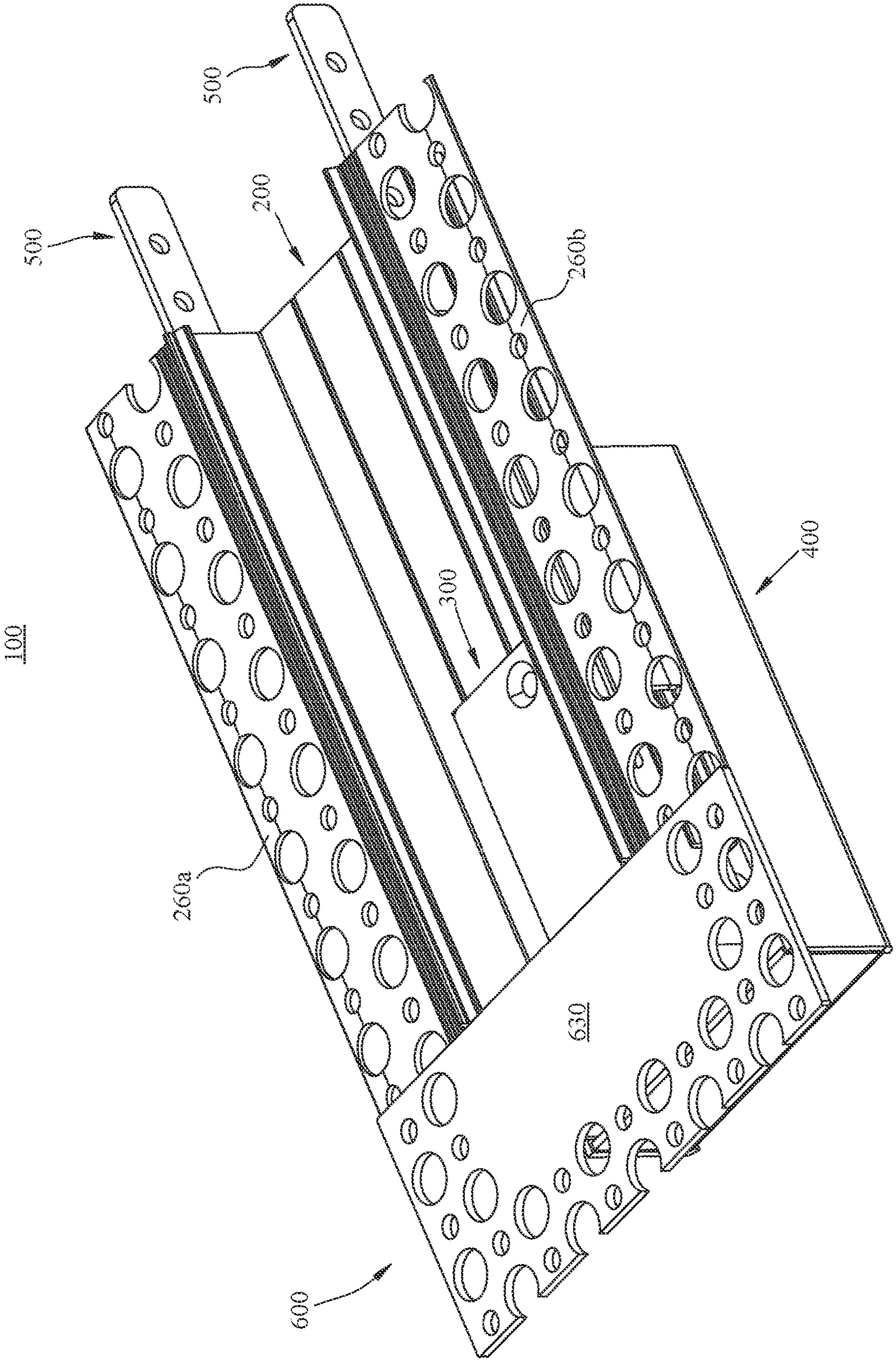
FIG. 2A shows a top-facing perspective view of a modular mud-in channel lighting system with modular end cap in accordance with one or more embodiments of the present invention.
Figure 2B:
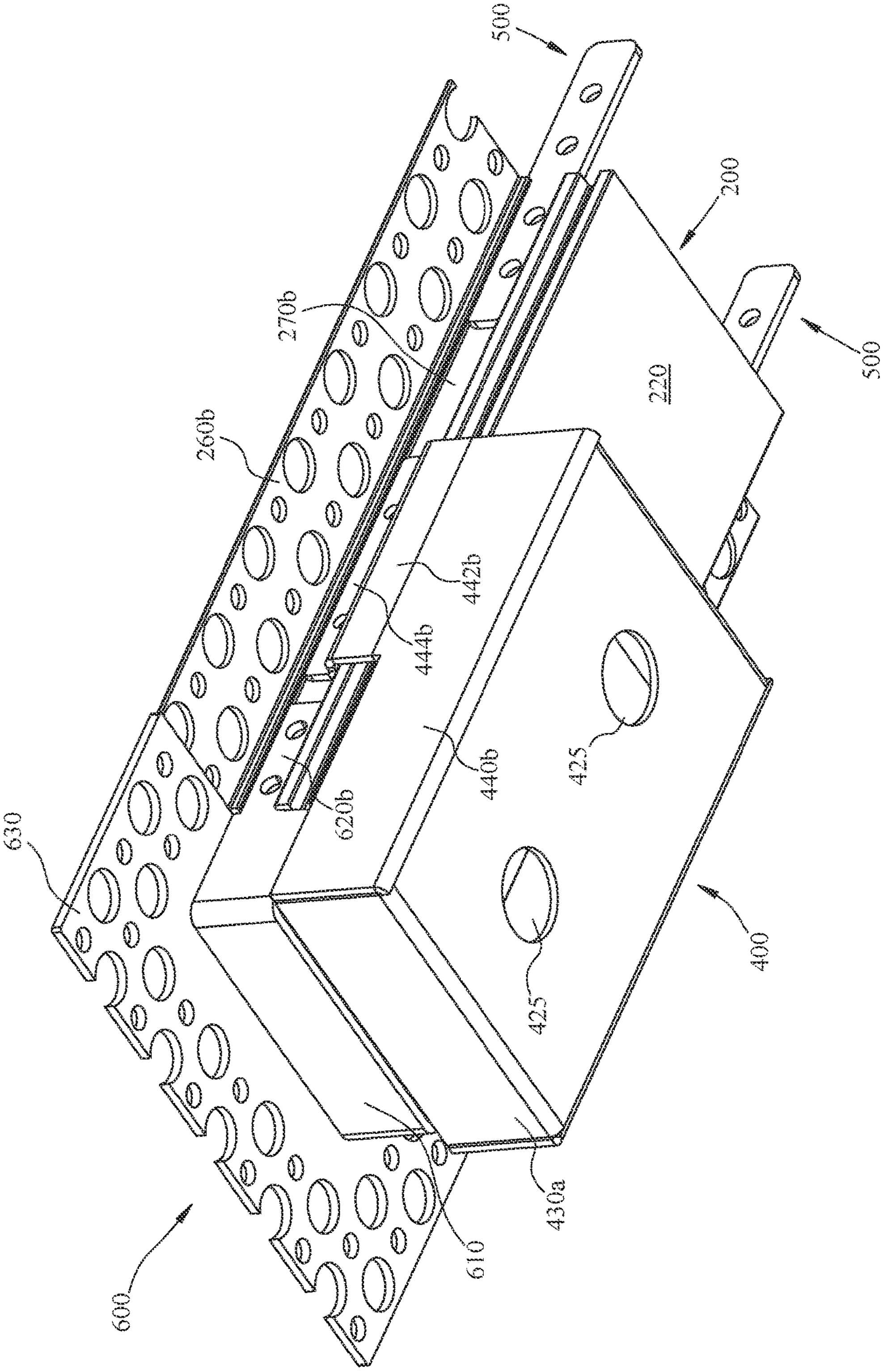
FIG. 2B shows a bottom-facing perspective view of the modular mud-in channel lighting system with modular end cap in accordance with one or more embodiments of the present invention.

FIG. 2A shows a top-facing perspective view of modular mud-in channel lighting system 100 with modular end cap 600 in accordance with one or more embodiments of the present invention. In certain embodiments, modular mud-in channel lighting system 100 may include one or more modular end caps 600 disposed on distal ends of the assembly. Modular end cap 600 may assist in securing modular mud-in channel lighting system 100 in place, creating a seamless look to the lighting display, and preventing light leakage. Modular end cap 600 may include support structure 610, first end cap joiner (not shown), second send cap joiner (not shown), and end cap mounting wing 630. Continuing, FIG. 2B shows a bottom-facing perspective view of modular mud-in channel lighting system 100 with modular end cap 600 in accordance with one or more embodiments of the present invention. Modular end cap 600 may be removably attached to modular channel 200 by sliding first end cap joiner (not shown) and second end cap joiner 620*b* into first assembly rail (not shown) and second assembly rail 270*b* of modular channel 200.

Figure 2C:
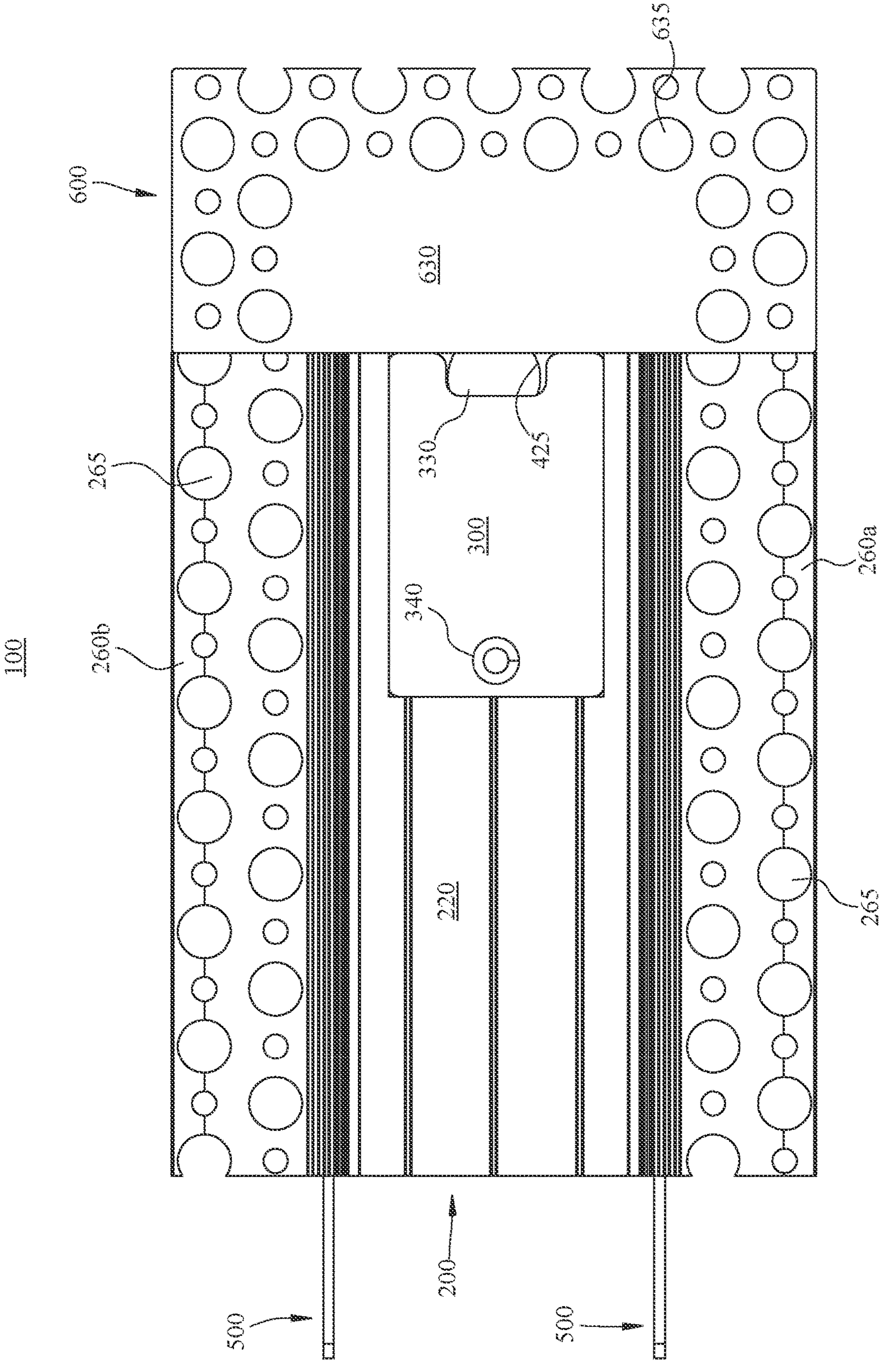
FIG. 2C shows a top plan view of the modular mud-in channel lighting system with modular end cap in accordance with one or more embodiments of the present invention.
Figure 2D:
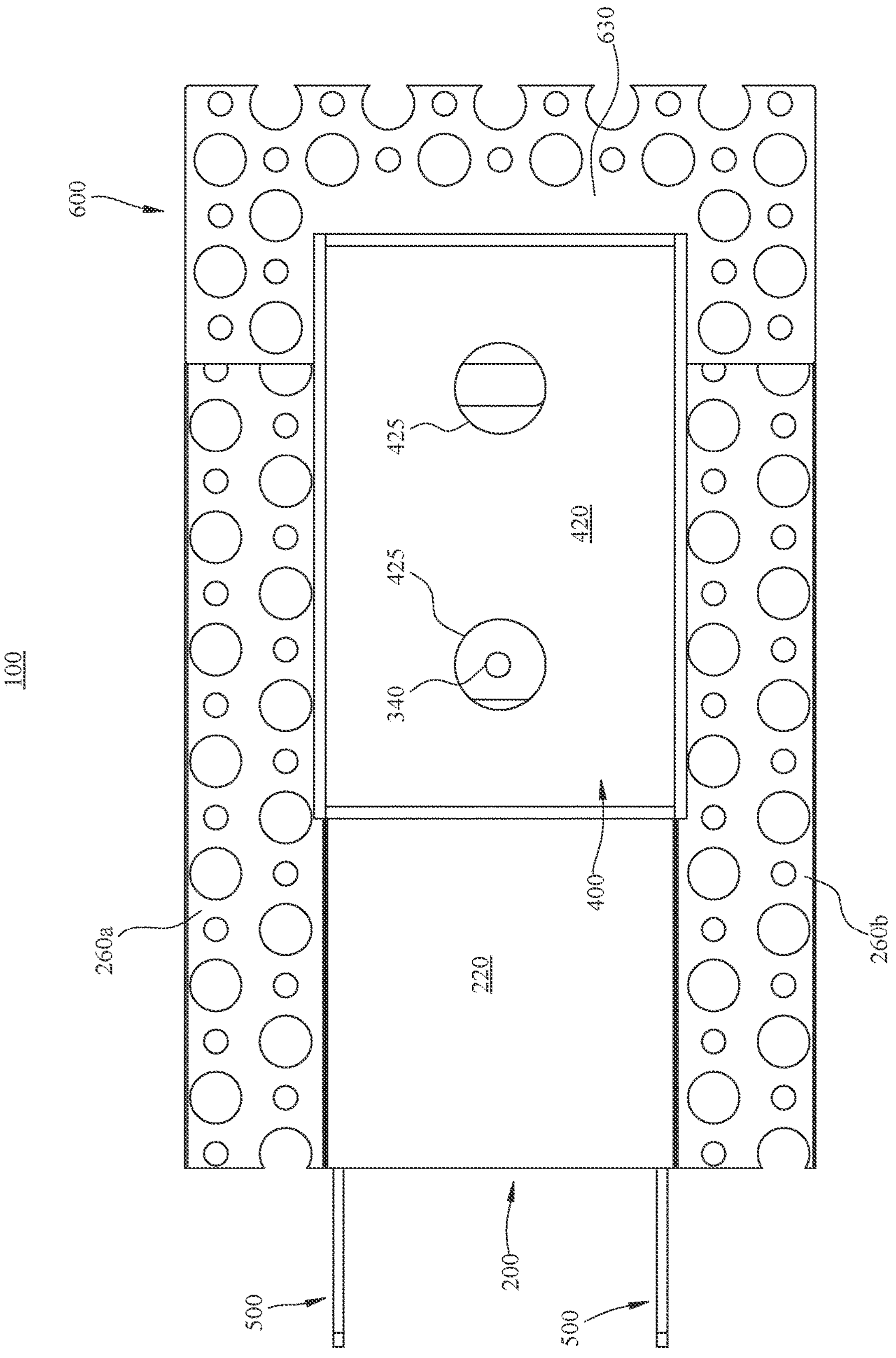
FIG. 2D shows a bottom plan view of the modular mud-in channel lighting system with modular end cap in accordance with one or more embodiments of the present invention.

Continuing, FIG. 2C shows a top plan view of modular mud-in channel lighting system 100 with modular end cap 600 in accordance with one or more embodiments of the present invention. Modular end cap 600 may include end cap mounting wing 630 that is similar to first mounting wing 260*a* and second mounting wing 260*b*, except end cap mounting wing 630 may include a first portion that includes mounting holes 635 and another portion that does not to prevent light leakage. When modular end cap 600 is removably attached to modular channel 200, when viewed from this top plan view, only the base portion 220 of modular channel 200 is exposed, such that, when LED strip lighting (not shown) is disposed thereon, there will be no light leakage out of modular end cap 600. Continuing, FIG. 2D shows a bottom plan view of modular mud-in channel lighting system 100 with modular end cap 600 in accordance with one or more embodiments of the present invention.

Figure 2E:
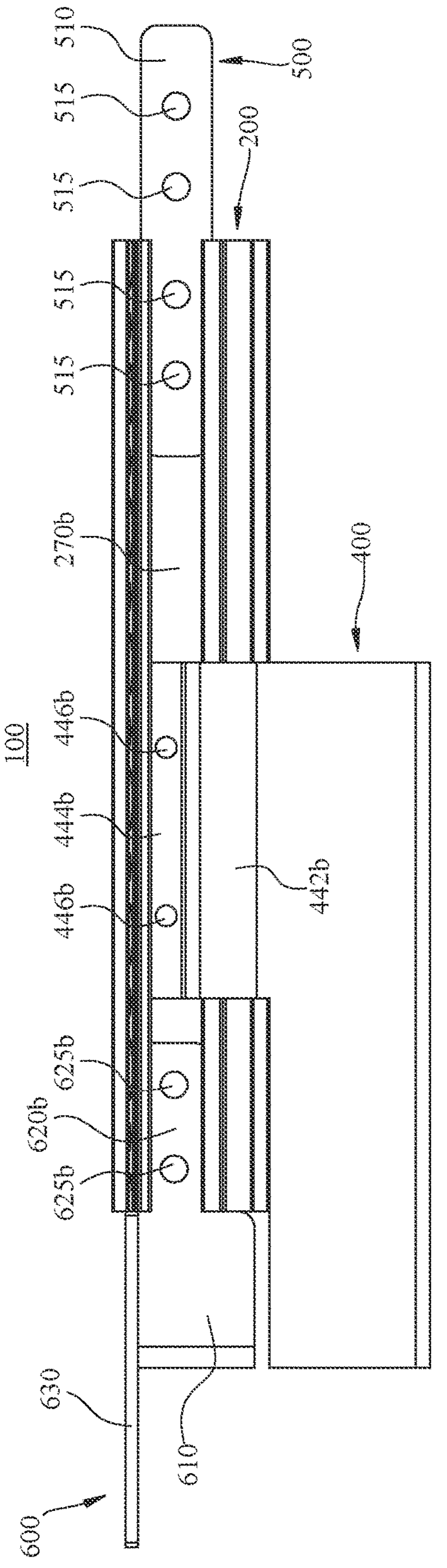
FIG. 2E shows a left elevation view of the modular mud-in channel lighting system with modular end cap in accordance with one or more embodiments of the present invention.
Figure 2F:
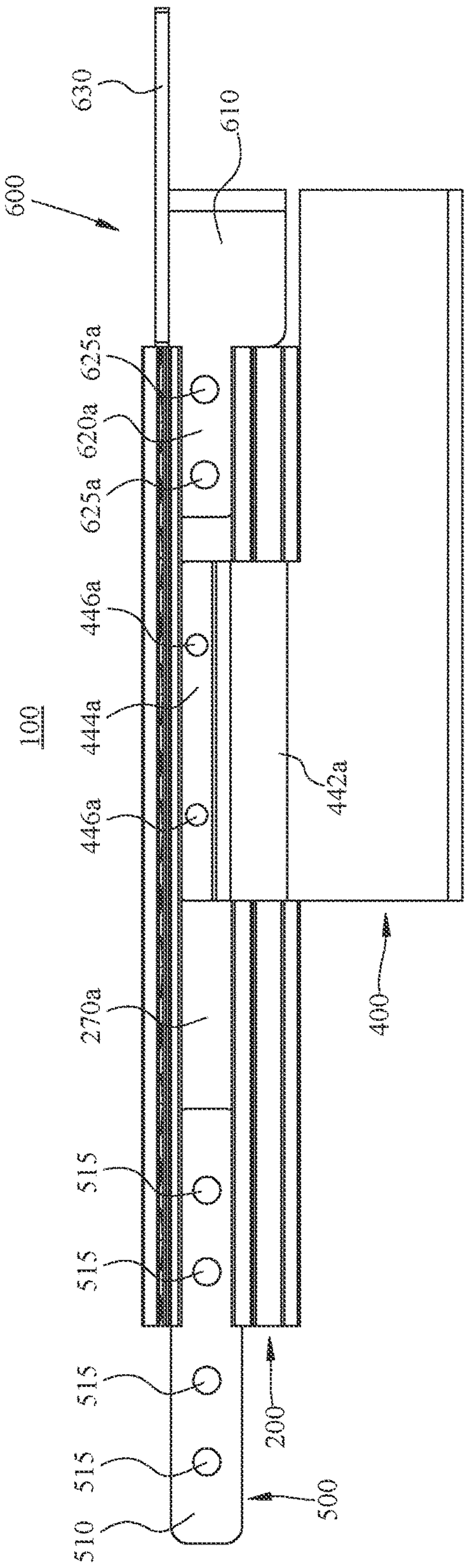
FIG. 2F shows a right elevation view of the modular mud-in channel lighting system with modular end cap in accordance with one or more embodiments of the present invention.

Continuing, FIG. 2E shows a left elevation view of modular mud-in channel lighting system 100 with modular end cap 600 in accordance with one or more embodiments of the present invention. Modular end cap 600 may include second end cap joiner 620*b* that is removably attached to second assembly rail 270*b* of modular channel 200. Once modular end cap 600 is in a desired location, set screws (not shown) may be used to secure it in place with mounting holes 625*b* of second end cap joiner 620*b*. A modular joiner 500 may be at least partially disposed with second assembly rail 270*b*, with the exposed portion available for expansion with additional modular channels (e.g., 200), if necessary. Continuing, FIG. 2F shows a right elevation view of modular mud-in channel lighting system 100 with modular end cap 600 in accordance with one or more embodiments of the present invention. Modular end cap 600 may include first end cap joiner 620*a* that is removably attached to first assembly rail 270*a* of modular channel 200. Once modular end cap 600 is in a desired location, set screws (not shown) may be used to secure it in place with mounting holes 625*a* of first end cap joiner 620*a*. A modular joiner 500 may be at least partially disposed with first assembly rail 270*a*, with the exposed portion available for expansion with additional modular channels (e.g., 200), if necessary.

Figure 2G:
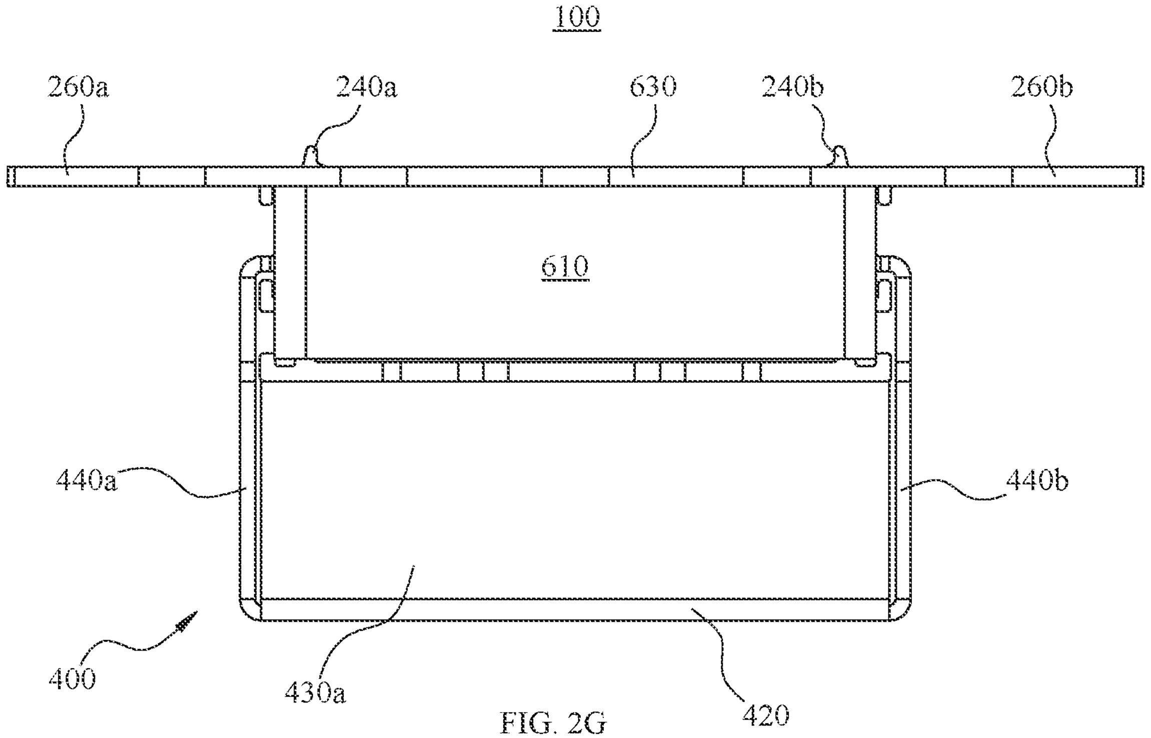
FIG. 2G shows a front elevation view of the modular mud-in channel lighting system with modular end cap in accordance with one or more embodiments of the present invention.
Figure 2H:
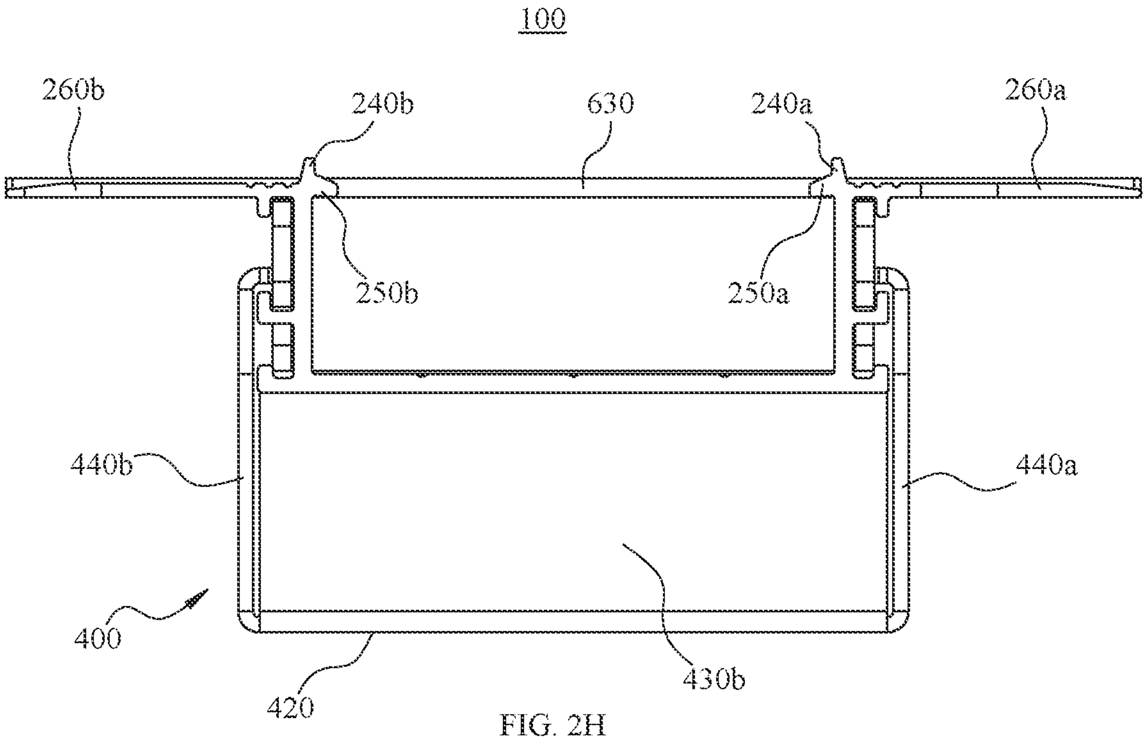
FIG. 2H shows a rear elevation view of the modular mud-in channel lighting system with modular end cap in accordance with one or more embodiments of the present invention.

Continuing, FIG. 2G shows a front elevation view of modular mud-in channel lighting system 100 with modular end cap 600 in accordance with one or more embodiments of the present invention. As shown, end cap mounting wing 630 is substantially flush with first mounting wing 260*a* and second mounting wing 260*b* of modular channel 200. First mud-in protection feature 240*a* and second mud-in protection feature 240*b* remain exposed for protection from build up during finishing (not shown). Continuing, FIG. 2H shows a rear elevation view of modular mud-in channel lighting system 100 with modular end cap 600 in accordance with one or more embodiments of the present invention. In this rear view, first diffuser retention feature 250*a* and second diffuser retention feature 250*b* are shown relative to first mud-in retention feature 240*a*, second mud-in retention feature 240*b*, and end cap mounting wing 630. After finishing (not shown), the built up tape, mud, texture, and/or paint should be flush with the top portion of first mud-in protection feature 240*a* and second mud-in protection feature 240*b*. A diffuser (not shown) may be secured such that it too is flush with the top of first mud-in protection feature 240*a* and second mud-in protection feature 240*b* and secured in place by first diffuser retention feature 250*a* and second diffuser retention feature 250*b*.

Figure 2I:
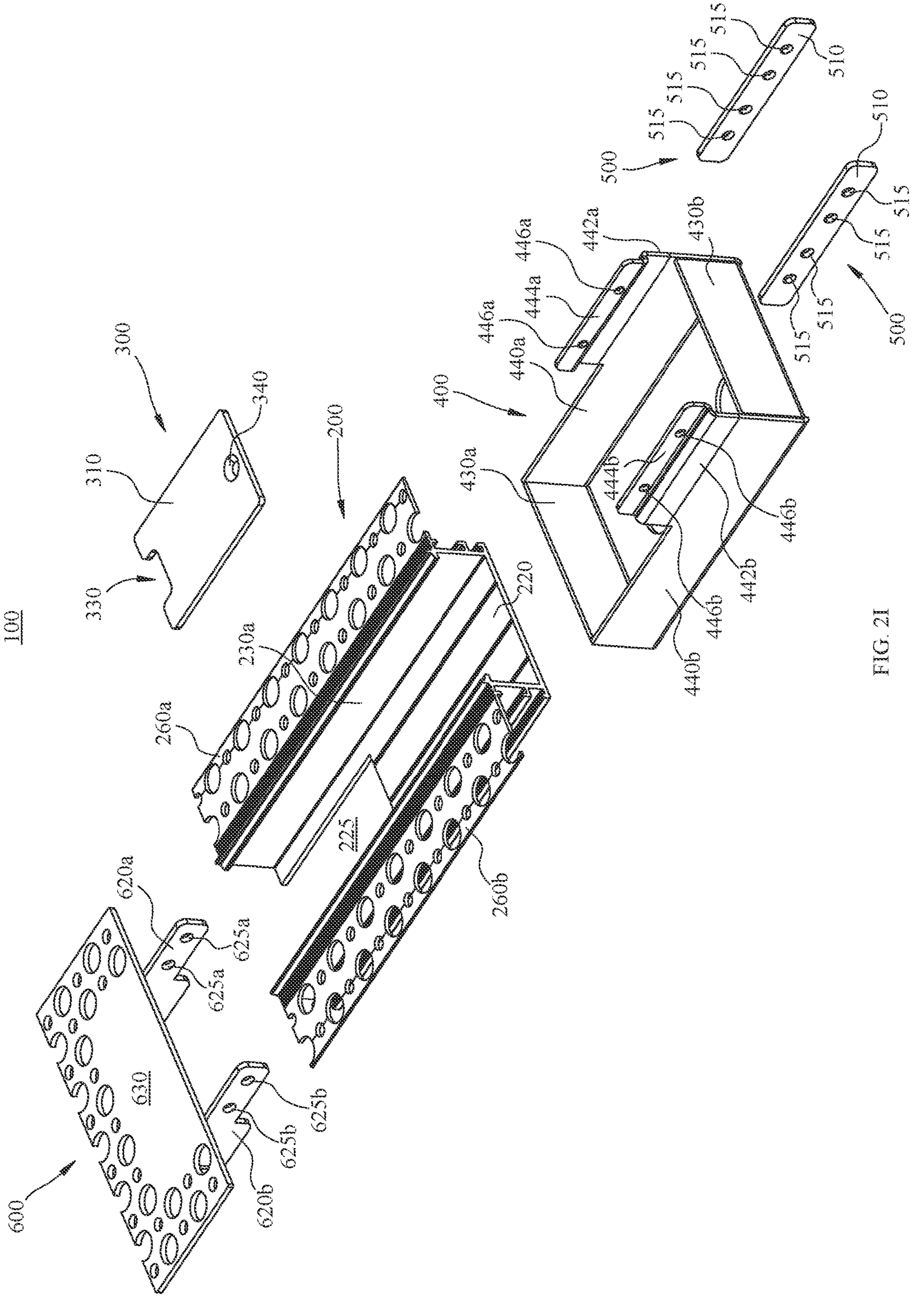
FIG. 2I shows a top-facing exploded perspective view of the modular mud-in channel lighting system with modular end cap in accordance with one or more embodiments of the present invention.

Continuing, FIG. 2I shows a top-facing exploded perspective view of modular mud-in channel lighting system 100 with modular end cap 600 in accordance with one or more embodiments of the present invention. Modular mud-in lighting system 100 with modular end cap 600 may be removably attached to modular channel 200 by sliding first end cap joiner 620*a* into first assembly rail 270*a* and second end cap joiner 620*b* into second assembly rail 270*b*. Once modular end cap 600 is in a desired location, set screws (not shown) may be used to secure it in place with mounting holes 625*a* and 625*b* of first end cap joiner 620*a* and second end cap joiner 620*b* respectively. While not shown, a second modular channel (e.g., 200) may be removably attached to a rear distal of modular channel 200. The plurality of joiners 500 may be at least partially disposed in first assembly rail 270*a* and second assembly rail 270*b*, with the exposed portions used to connect to first assembly rail (e.g., 270*a*) and second assembly rail (e.g., 270*b*) of the additional modular channel (e.g., 200). One of ordinary skill in the art, having the benefit of this disclosure will appreciate that a plurality of modular channels 200 may be removably attached to one another as is necessary to achieve a desired length for the lighting solution for a given application or design.

Figure 3A:
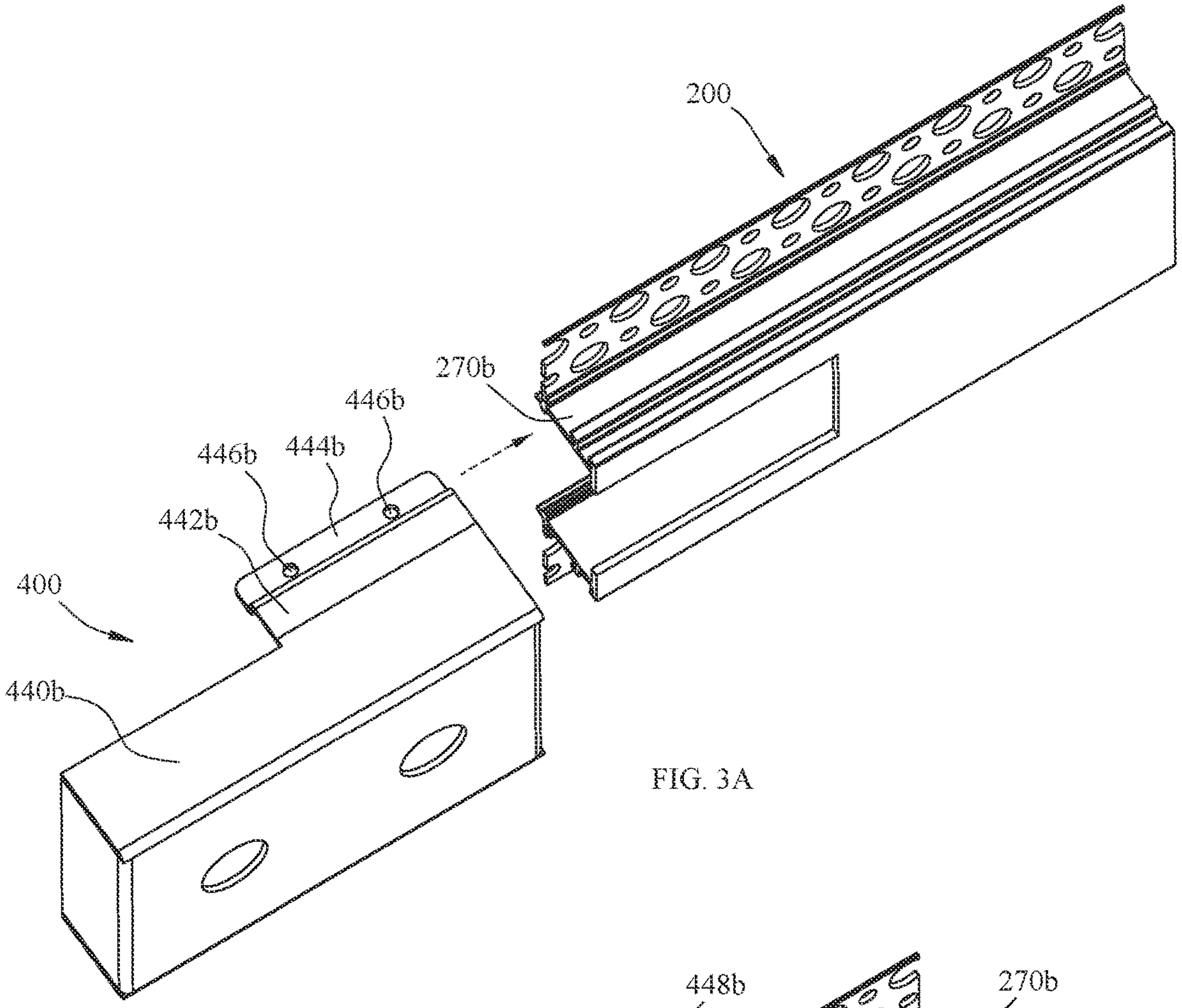
FIG. 3A shows a bottom-facing perspective view of a modular connection box prior to attachment to a modular channel of a modular mud-in channel lighting system in accordance with one or more embodiments of the present invention.
Figure 3B:
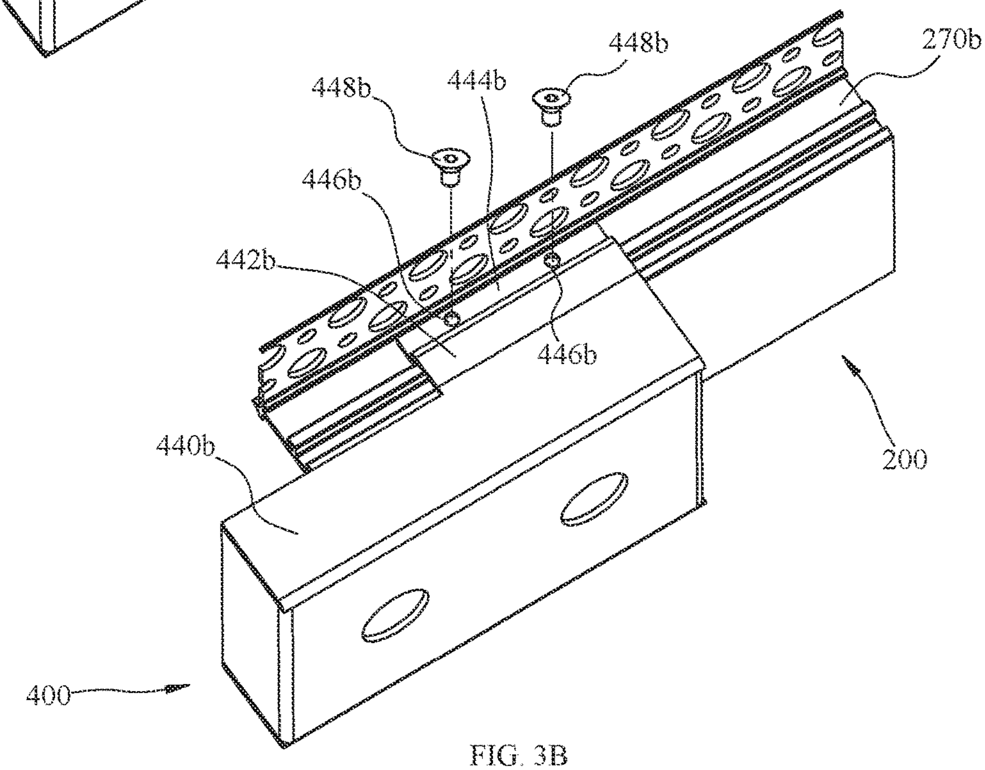
FIG. 3B shows a bottom-facing perspective view of the attachment of the modular connection box to the modular channel in accordance with one or more embodiments of the present invention.

FIG. 3A shows a bottom-facing perspective view of modular connection box 400 prior to attachment to modular channel 200 of a modular mud-in channel lighting system (e.g., 100) in accordance with one or more embodiments of the present invention. As previously discussed, first box joiner (not shown) and second box joiner 444*b* may slide into first assembly rail (not shown) and second assembly rail 270*b* of modular channel 200. Continuing, FIG. 3B shows a bottom-facing perspective view of the attachment of modular connection box 400 to modular channel member 200 in accordance with one or more embodiments of the present invention. Advantageously, modular connection box 400 does not require connectivity to any stud (not shown), joist (not shown), or pre-existing junction box (not shown), thereby freeing the installation of custom lighting from any such constraints.

Figure 4A:
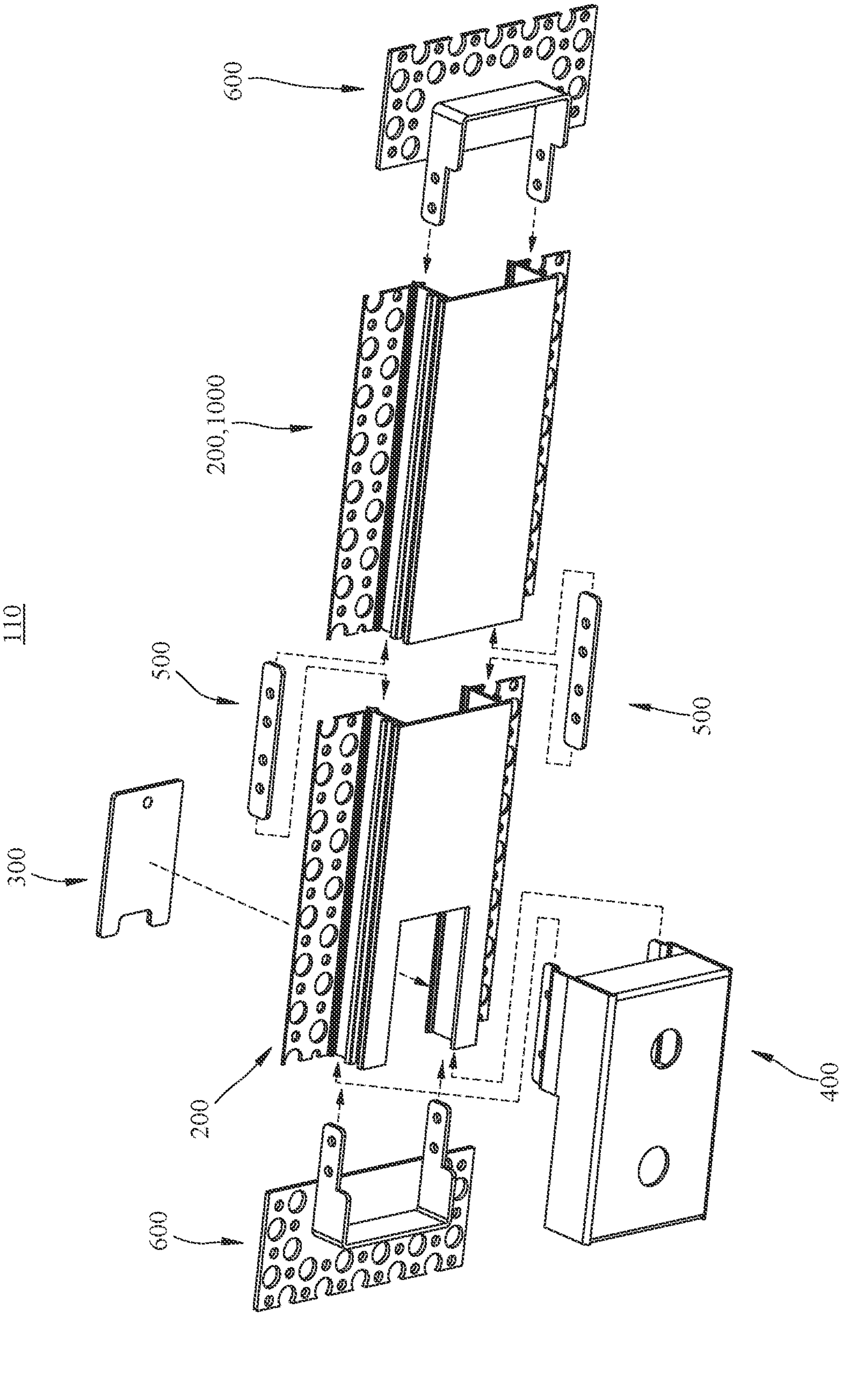
FIG. 4A shows a bottom-facing exploded perspective view of an exemplary configuration of a modular mud-in channel lighting system prior to installation in accordance with one or more embodiments of the present invention.

FIG. 4A shows a bottom-facing exploded perspective view of an exemplary configuration 110 of a modular mud-in channel lighting system (e.g., 100) prior to installation in accordance with one or more embodiments of the present invention. An exemplary configuration 110 of a modular mud-in channel lighting system is shown for purposes of illustration only. One of ordinary skill in the art, having the benefit of this disclosure, will appreciate that a modular mud-in channel lighting system may include one or more modular channels 200, one or more optional trap doors 300, one or more modular connection boxes 400, one or more optional modular joiners 500, and one or more optional modular end caps 600. While not limiting, this exemplary configuration 110 shows how one could arrange a plurality of modular channels 200 (or 1000 as discussed in more detail herein) to achieve a desired length for the lighting solution. For the purposes of this example, modular channel 1000 is the same as modular channel 200, with the exception that there is no optional trap door receiver (e.g., 225 of modular channel 200) and does not require an optional trap door 300. As such, modular channel 1000 may be used for portions of a modular mud-in channel lighting system 110 that do not have a modular connection box 400 attached thereto.

Figure 4B:
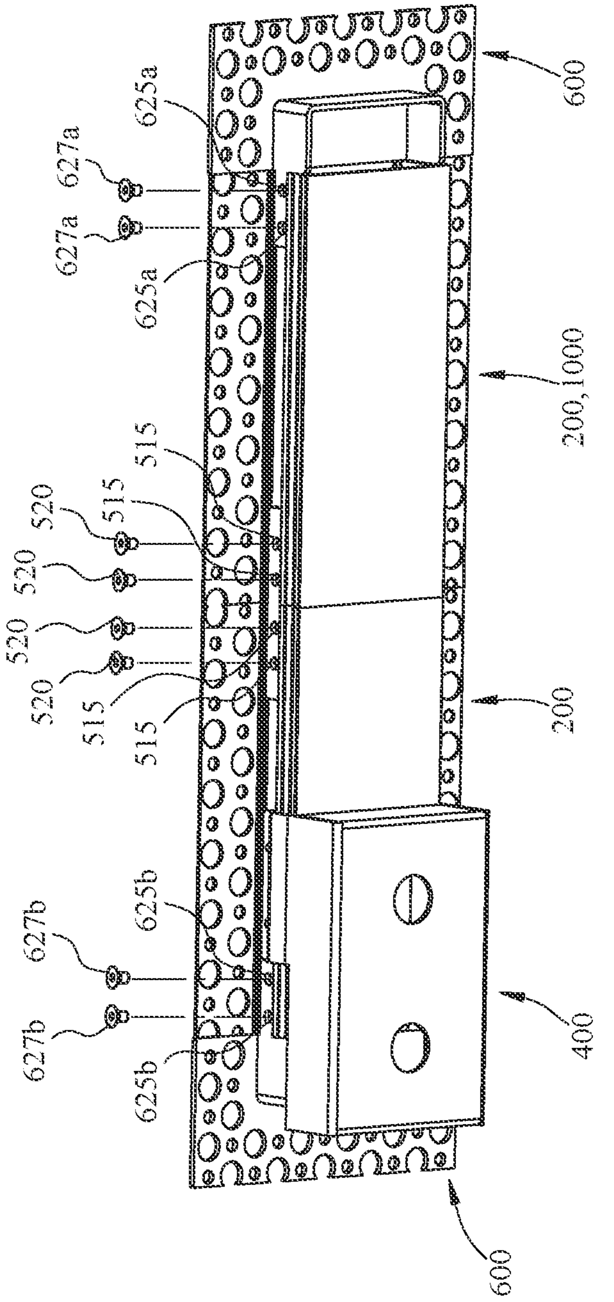
FIG. 4B shows a bottom-facing assembled perspective view of the exemplary modular mud-in channel lighting system prior to installation in accordance with one or more embodiments of the present invention.

A method of installing a modular mud-in channel lighting system 110 may include assembling the modular mud-in channel lighting system, wherein the modular mud-in channel lighting system 110 includes at least one modular channel 200, 1000, at least one modular connection box 400, and at least one modular end cap 600. Continuing, FIG. 4B shows a bottom-facing assembled perspective view of the exemplary configuration 110 of a modular mud-in channel lighting system (e.g., 100) prior to installation in accordance with one or more embodiments of the present invention. Once the desired components of system 110 are assembled and placed in their desired locations, set screws may be used to secure the components in place.

Figure 4C:
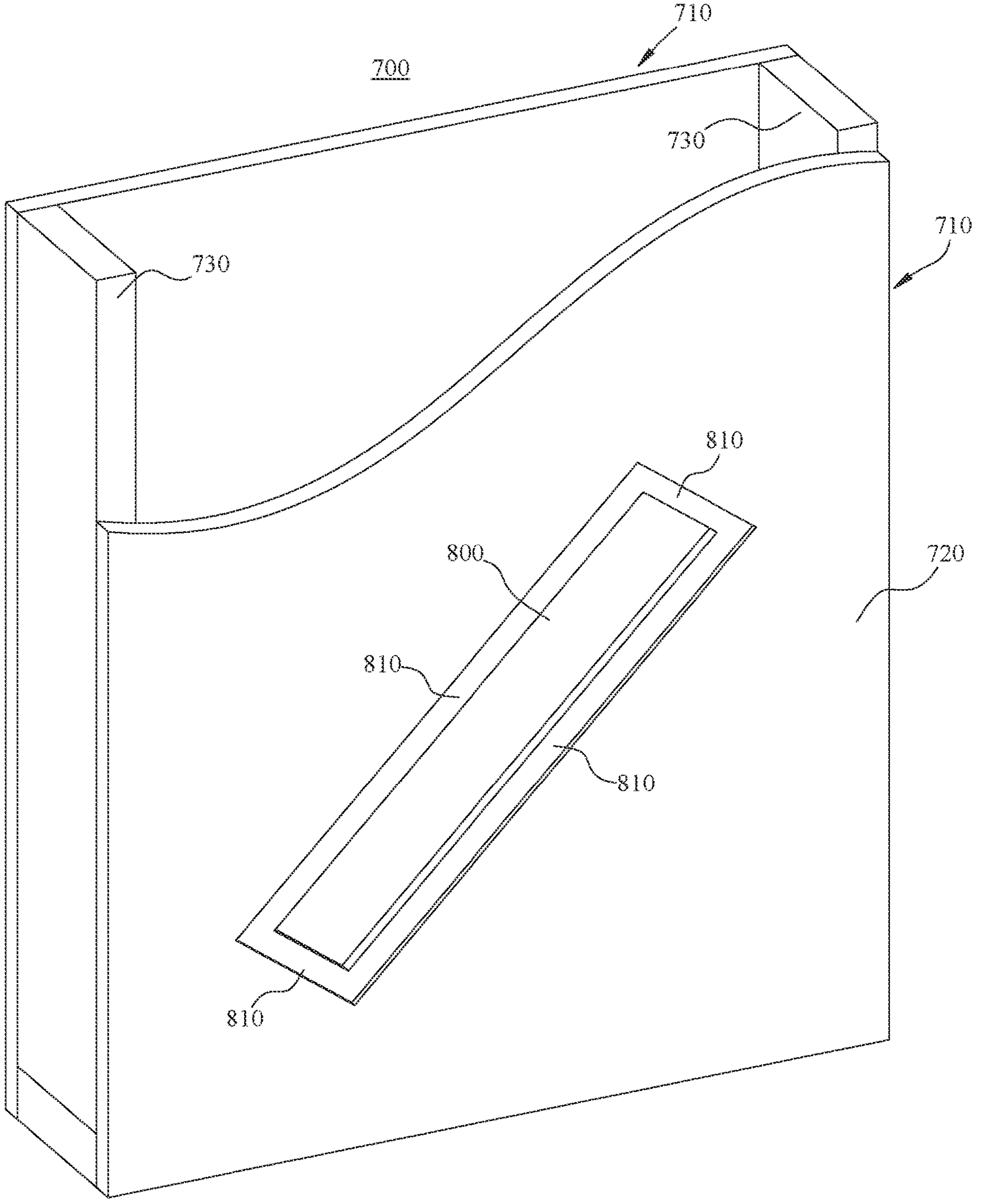
FIG. 4C shows a drywall cutout formed in a wall or ceiling structure to receive the exemplary modular mud-in channel lighting system in accordance with one or more embodiments of the present invention.

Continuing, FIG. 4C shows a drywall cutout 800 formed in a wall or ceiling structure 700 to receive the exemplary 110 modular mud-in channel lighting system in accordance with one or more embodiments of the present invention. Drywall structure 700 may include a facing surface sheet portion 720, a plaster core (not independently illustrated), and a rear surface sheet portion (not independently illustrated). Drywall 710 may be secured to studs 730 of drywall structure 700. The method may further include cutting a rectangular cutout 800 in drywall 710 of drywall structure 700, where the cutout 800 has a width approximately equal to a width of modular connection box 400 and a length approximately equal to a length of the base portion (e.g., 220) of the at least one modular channels 200, 1000 and the length of the support structure (e.g., 610) of the at least one modular end caps 600. One of ordinary skill in the art, having the benefit of this disclosure will appreciate that approximately equal in this context means within a degree of equality that permits the assembled exemplary 110 modular mud-in channel lighting system to be disposed within drywall cutout 800. Drywall cutout 800 may be disposed at any angle relative to the one or more studs 730 of drywall structure 700 and without regard to the location of any junction boxes (not shown). The method may further include skinning facing surface sheet portion 720 of the drywall structure surrounding cutout 800, wherein the skinned portion 810 has a width approximately equal to a width of a mounting wing (e.g., 260*a*, 260*b*) of the at least one modular channel (e.g., 200). One of ordinary skill in the art, having the benefit of this disclosure will appreciate that approximately equal in this context means within a degree of equality that permits the mounting wings (e.g., 260*a*, 260*b*) to fit within the skinned portion 810 of drywall 720.

Figure 4D:
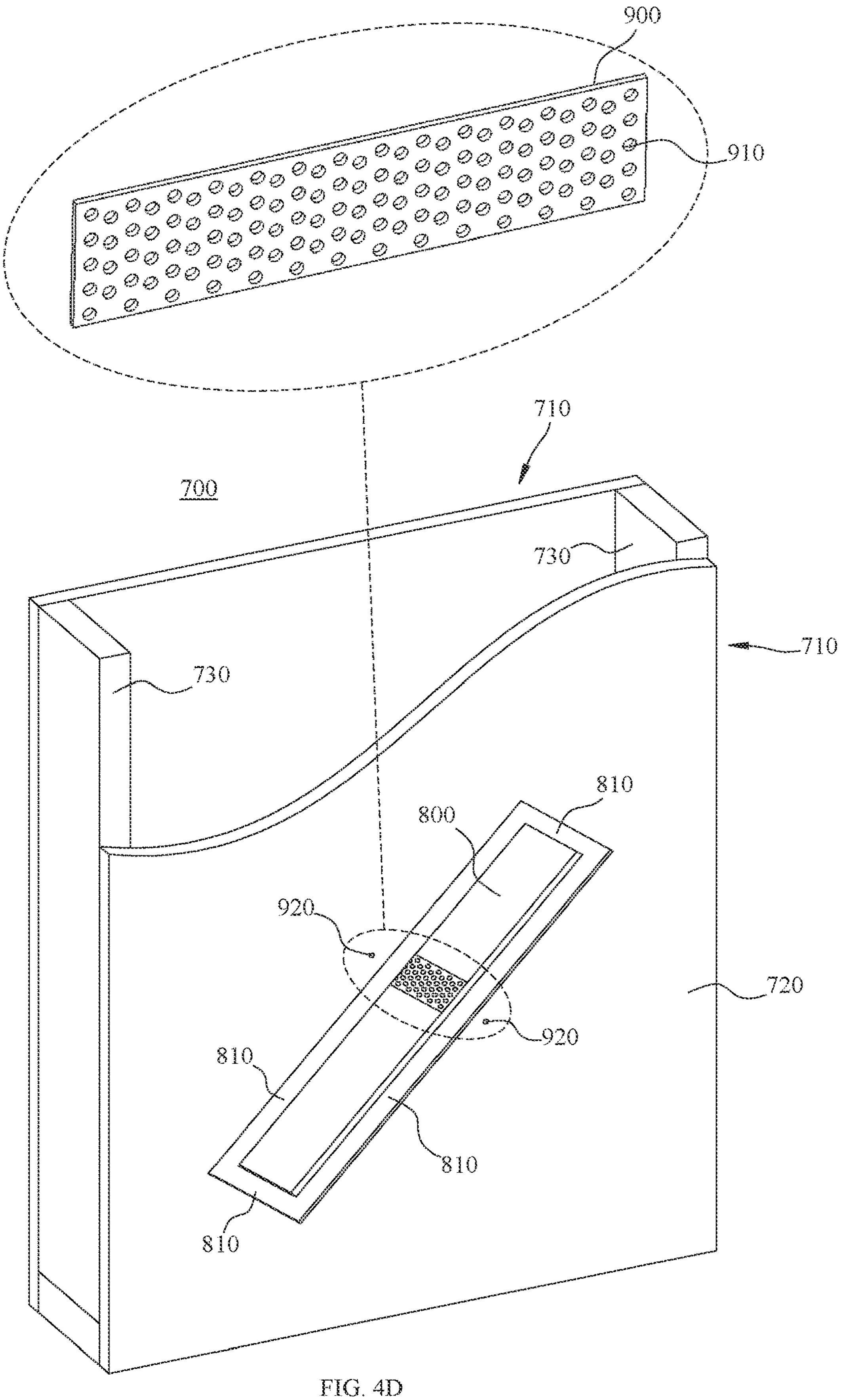
FIG. 4D shows a drywall mount installed across the drywall cutout formed in the wall or ceiling structure prior to installation of the exemplary modular mud-in channel lighting system in accordance with one or more embodiments of the present invention.

Continuing, FIG. 4D shows a drywall mount 900 installed across the drywall cutout 800 formed in wall or ceiling structure 700 prior to installation of exemplary modular mud-in channel lighting system (e.g., 110) in accordance with one or more embodiments of the present invention. The method may further include securing at least one drywall mounts 900 to a rear surface sheet portion (not independently illustrated) of rear drywall 710 of drywall structure 700, wherein the one or more drywall mounts 900 traverse at least the width of cutout 800.

Figure 4E:
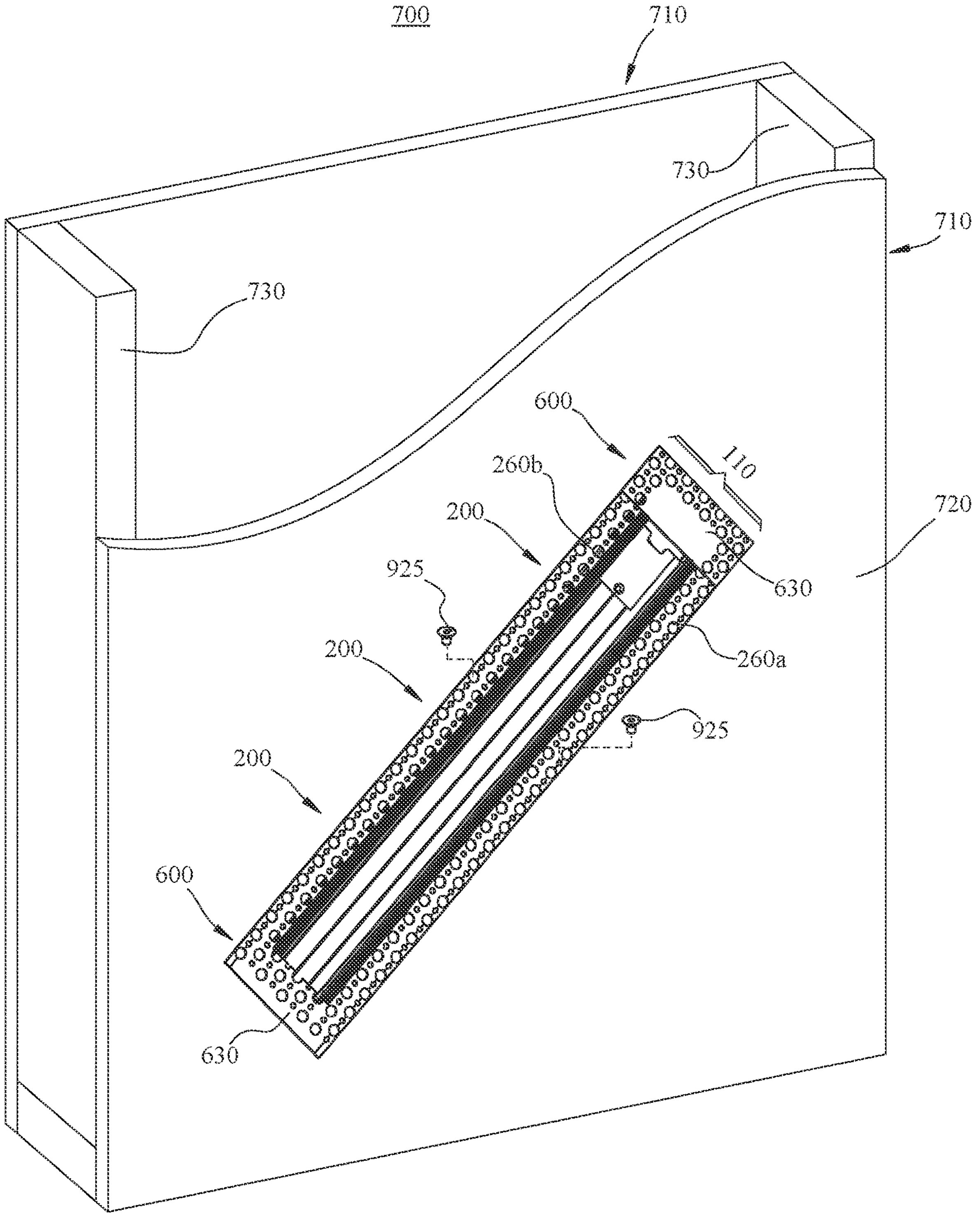
FIG. 4E shows the exemplary modular mud-in channel lighting system mounted to the drywall mount in accordance with one or more embodiments of the present invention.

Continuing, FIG. 4E shows exemplary modular mud-in channel lighting system 110 mounted to drywall 710 of drywall structure 700 in accordance with one or more embodiments of the present invention. The method may further include disposing the assembled modular mud-in channel lighting system 110 in the drywall cutout (e.g., 800), where first mounting wing 260*a* and second mounting wing 260*b* of the at least one modular channel 200 and the at least one end cap mounting wing 630 are disposed over the skinned portion 810 of the facing surface sheet portion 720 of drywall structure 700.

Figure 4F:
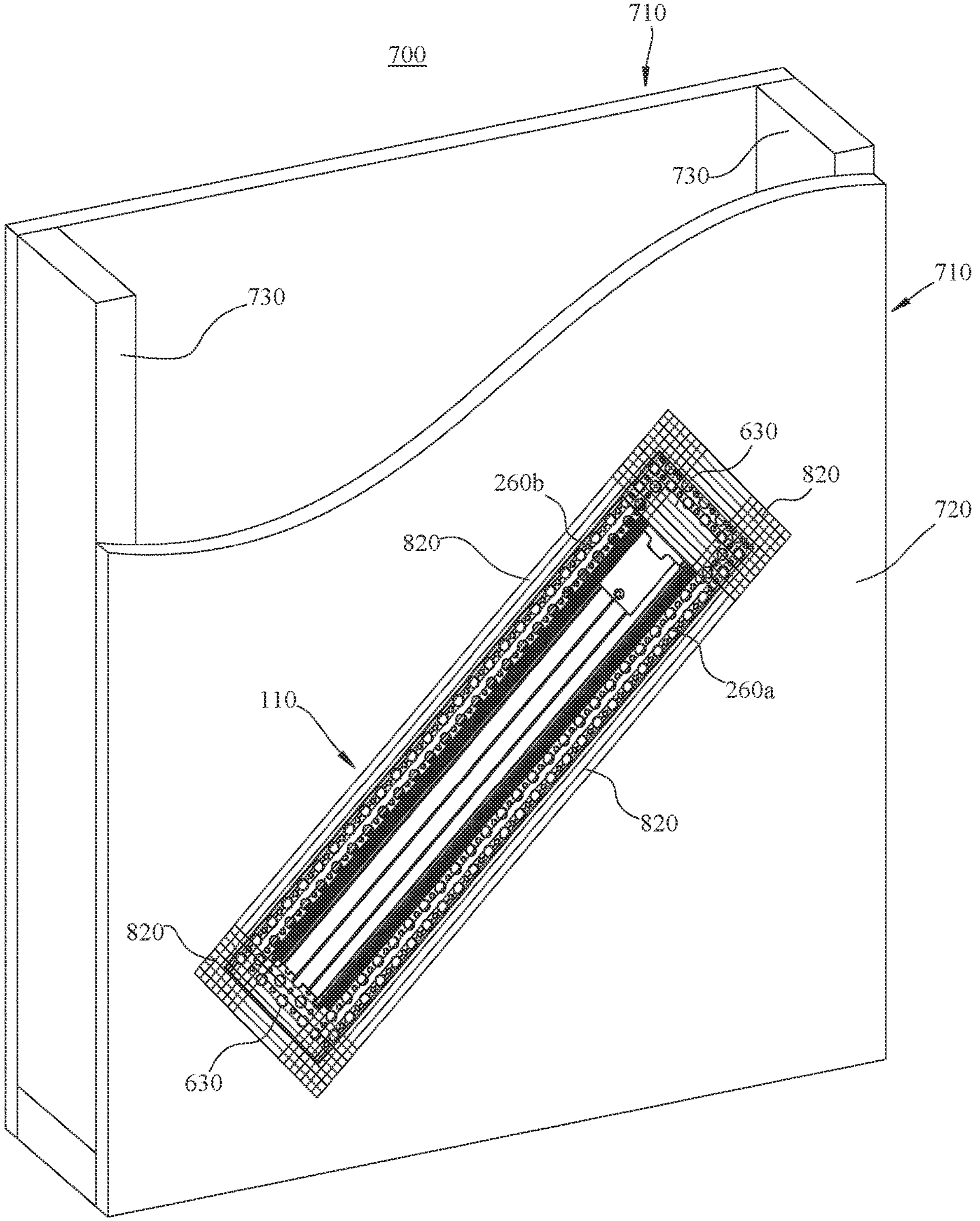
FIG. 4F shows the exemplary modular mud-in channel lighting system prior to being mudded-in channel to the drywall in accordance with one or more embodiments of the present invention.

Continuing, FIG. 4F shows exemplary modular mud-in channel lighting system 110 prior to being mudded-in channel to the drywall in accordance with one or more embodiments of the present invention. The method may further include applying drywall joint tape 820 over first mounting wing 260*a*, second mounting wing 260*b*, and end cap mounting wing 630 and a portion of facing surface sheet portion 720 of front facing drywall 710.

Figure 4G:
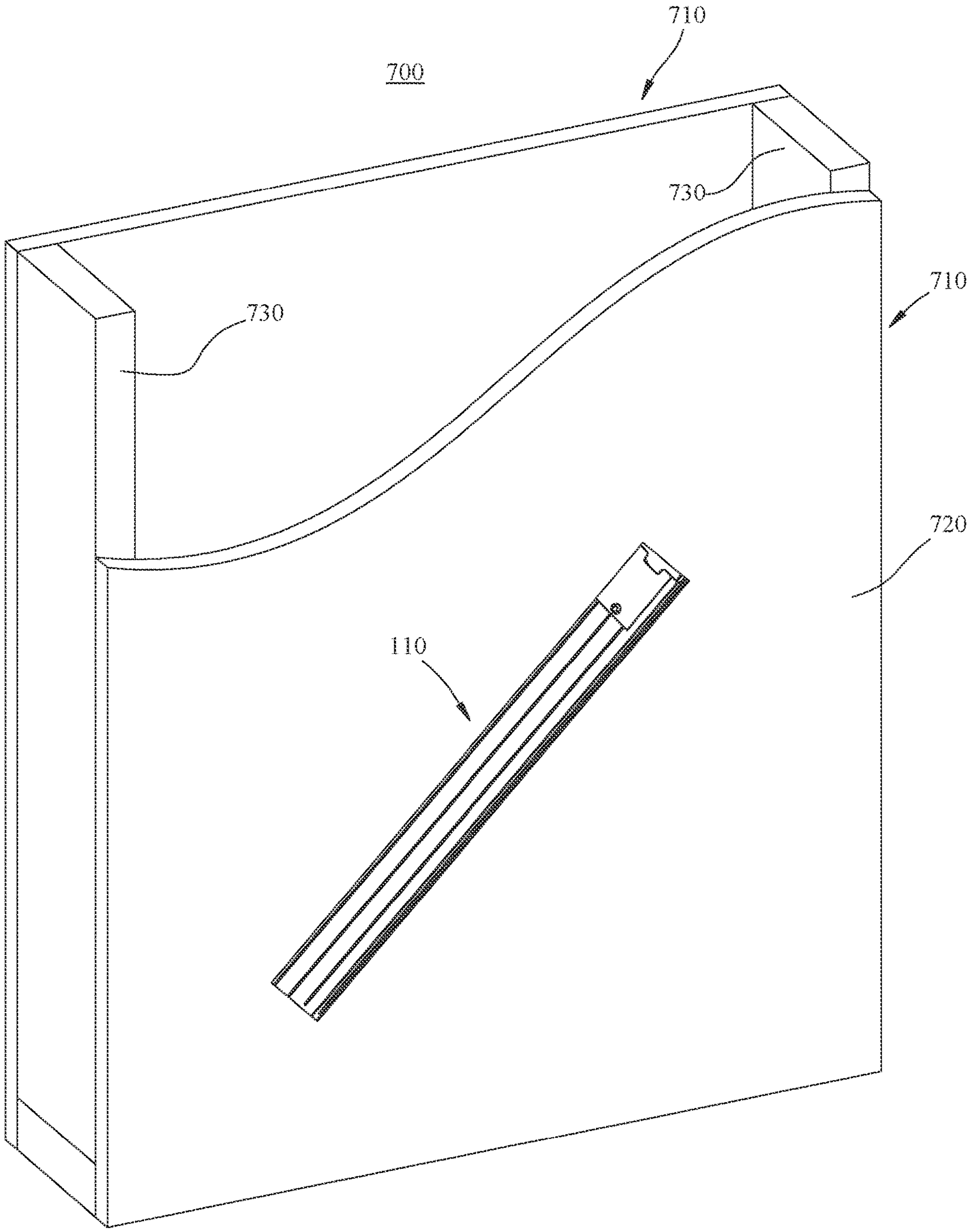
FIG. 4G shows the exemplary modular mud-in channel lighting system mudded-in the drywall in accordance with one or more embodiments of the present invention.

Continuing, FIG. 4G shows exemplary modular mud-in channel lighting system 110 mudded-in the drywall in accordance with one or more embodiments of the present invention. The method may further include applying drywall mud (not independently illustrated) over the drywall joint tape (e.g., 820 of FIG. 4F). In certain embodiments, the applied drywall mud (not shown) may be built-up, sanded, texturized, or otherwise prepared for painting and then painted (not shown).

Figure 4H:
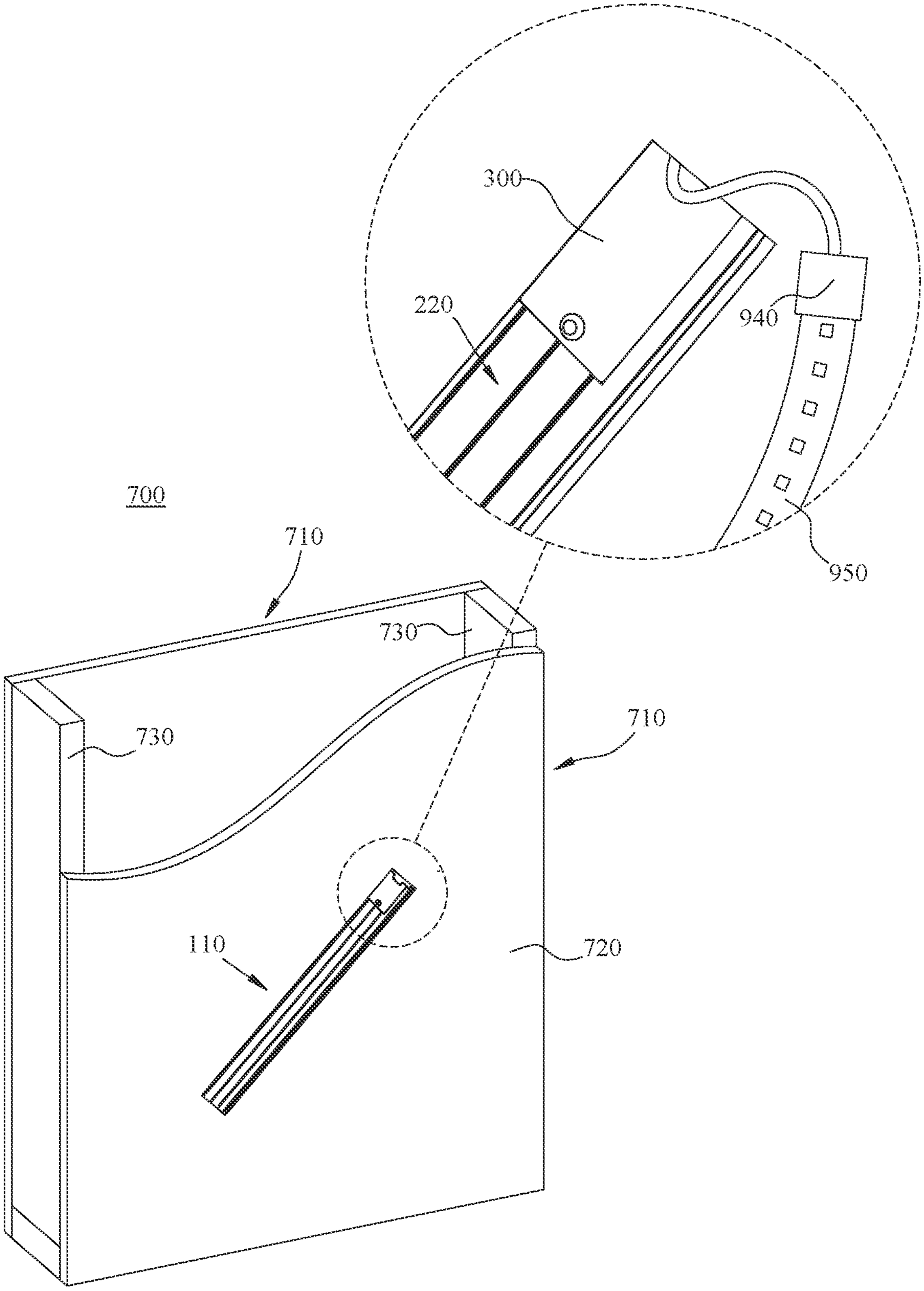
FIG. 4H shows LED strip lighting being installed in the exemplary modular mud-in channel lighting system in accordance with one or more embodiments of the present invention.

Continuing, FIG. 4H shows LED strip lighting 950 being installed in exemplary modular mud-in channel lighting system 110 in accordance with one or more embodiments of the present invention. The method may further include disposing strip lighting 950 on the base portion (e.g., 220) of the at least one modular channel (e.g., 200). The method may further include routing a wiring (not shown) through a wiring port (not shown) of modular connection box (not shown) and connecting the wiring (not shown) to an LED strip lighting connector 940 to power LED strip lighting 950.

Figure 4I:
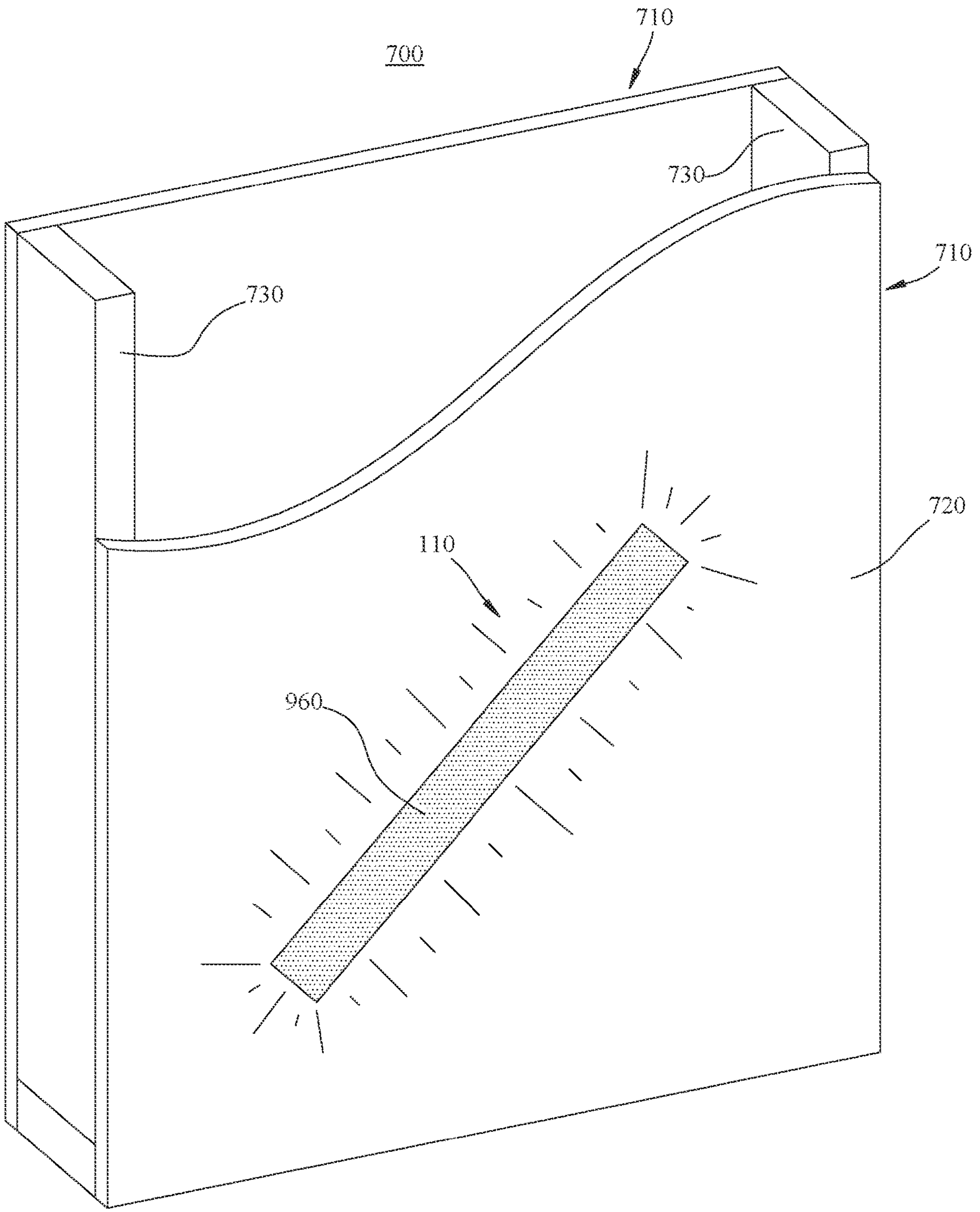
FIG. 4I shows a diffuser installed in the finished installation of the exemplary modular mud-in channel lighting system in accordance with one or more embodiments of the present invention.

Continuing, FIG. 4I shows a diffuser 960 installed in finished installation of the exemplary modular mud-in channel lighting system 110 in accordance with one or more embodiments of the present invention.

Figure 4J:
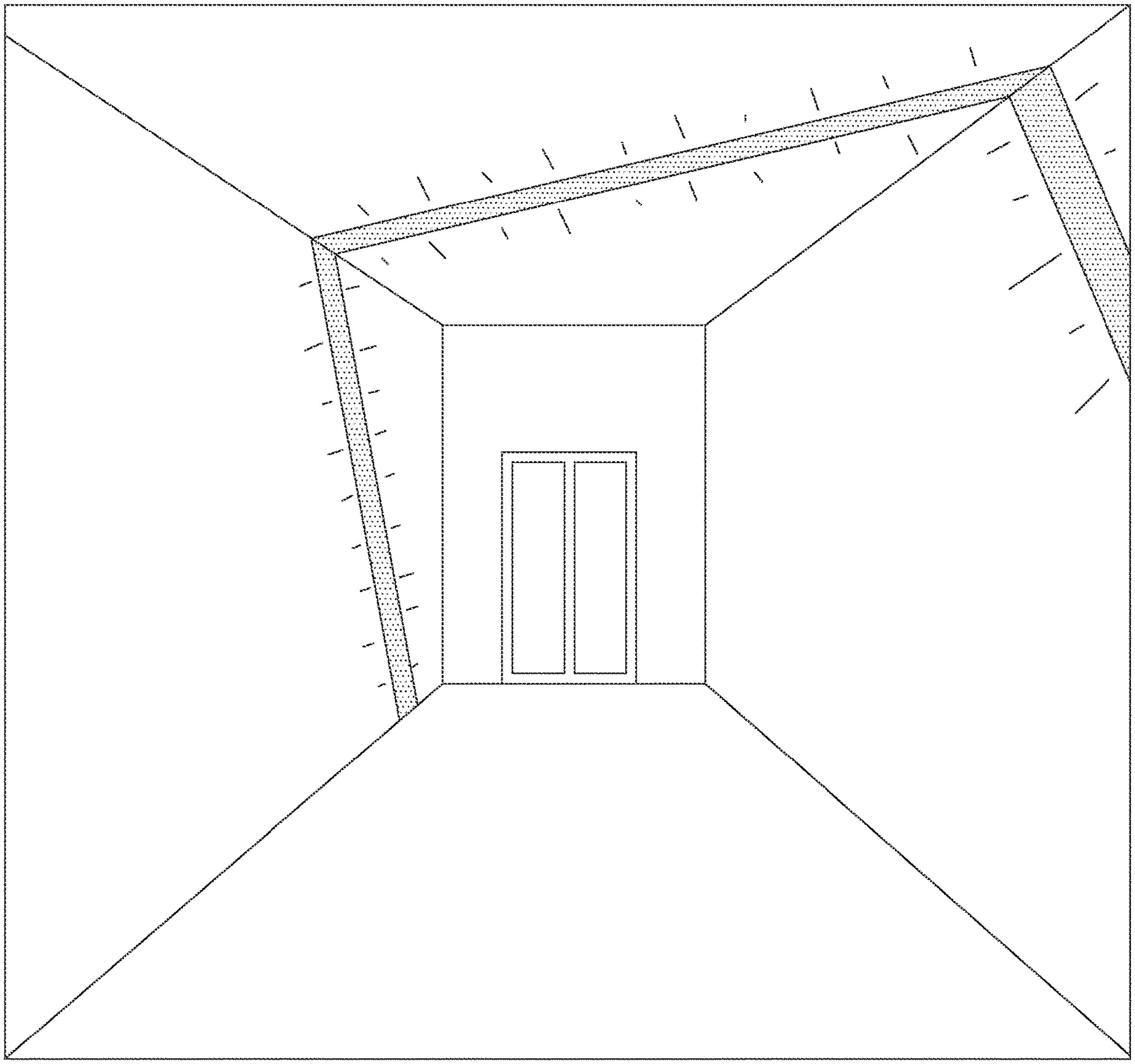
FIG. 4J shows an example installation of a modular mud-in channel lighting system in accordance with one or more embodiments of the present invention.

Continuing, FIG. 4J shows an example installation of a modular mud-in channel lighting system 110 in accordance with one or more embodiments of the present invention. Because a modular connection box (e.g., 400) attaches directly to a modular channel (e.g., 200) and does not require connection to any stud (not shown), joist (not shown), or junction box (not shown), unique and creative lighting solutions may be created that are disposed at angles that are not parallel or perpendicular to the floor and that cross multiple walls or ceiling structures.

Figure 5A:
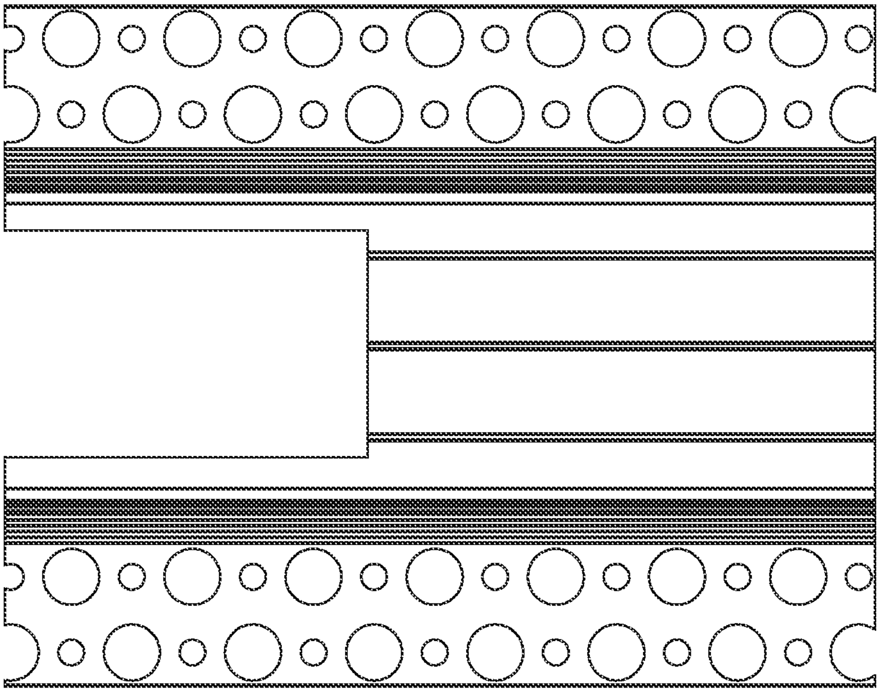
FIG. 5A shows a top plan view of a modular channel of a modular mud-in channel lighting system in accordance with one or more embodiments of the present invention.
Figure 5B:
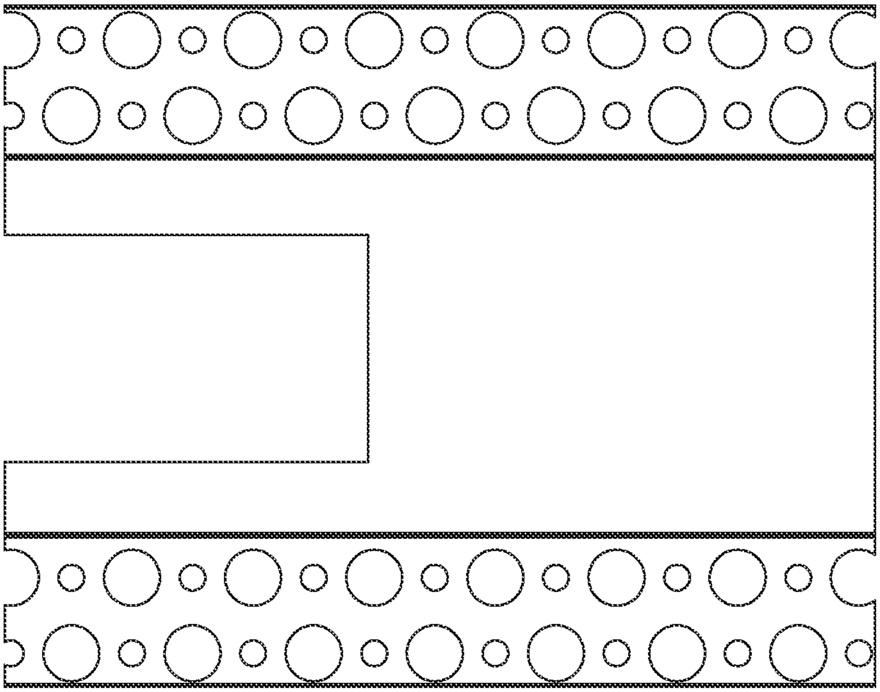
FIG. 5B shows a bottom plan view of the modular channel in accordance with one or more embodiments of the present invention.
Figure 5C:
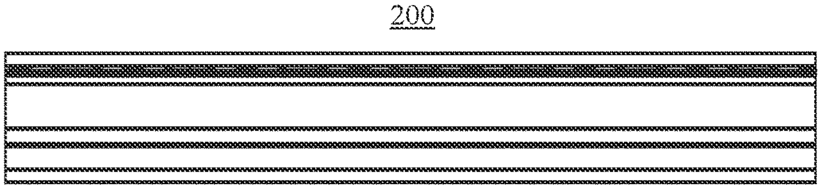
FIG. 5C shows a left elevation view of the modular channel in accordance with one or more embodiments of the present invention.
Figure 5D:
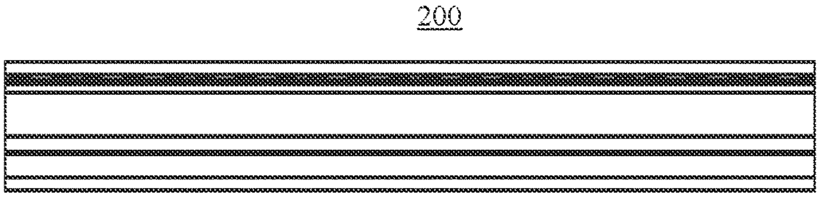
FIG. 5D shows a right elevation view of the modular channel in accordance with one or more embodiments of the present invention.
Figure 5E:
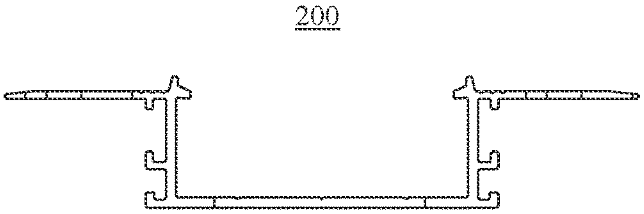
FIG. 5E shows a front elevation view of the modular channel in accordance with one or more embodiments of the present invention.
Figure 5F:
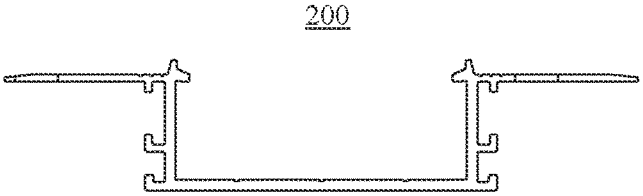
FIG. 5F shows a rear elevation view of the modular channel in accordance with one or more embodiments of the present invention.

FIG. 5A shows a top plan view of a modular channel 200 of a modular mud-in channel lighting system (e.g., 100) in accordance with one or more embodiments of the present invention. Continuing, FIG. 5B shows a bottom plan view of the modular channel 200 in accordance with one or more embodiments of the present invention. Continuing, FIG. 5C shows a left elevation view of the modular channel 200 in accordance with one or more embodiments of the present invention. Continuing, FIG. 5D shows a right elevation view of the modular channel 200 in accordance with one or more embodiments of the present invention. Continuing, FIG. 5E shows a front elevation view of the modular channel 200 in accordance with one or more embodiments of the present invention. Continuing, FIG. 5F shows a rear elevation view of the modular channel 200 in accordance with one or more embodiments of the present invention.

Figure 6A:
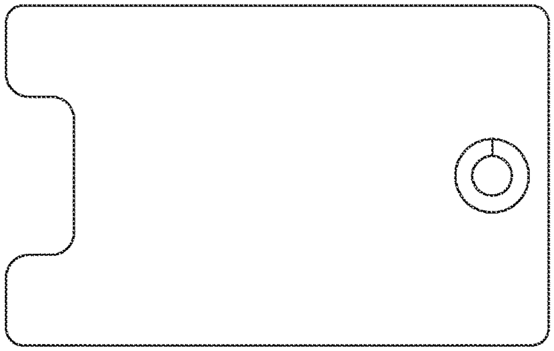
FIG. 6A shows a top plan view of a trap door for a modular channel of a modular mud-in channel lighting system in accordance with one or more embodiments of the present invention.
Figure 6B:
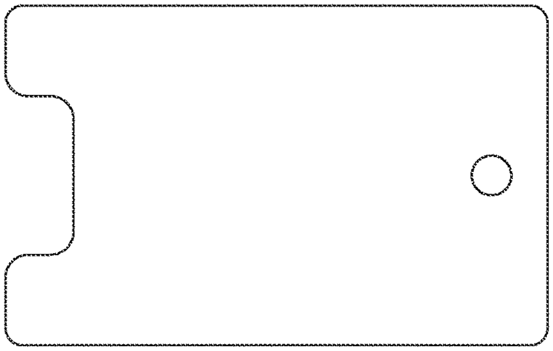
FIG. 6B shows a bottom plan view of the trap door in accordance with one or more embodiments of the present invention.
Figure 6C:
FIG. 6C shows a left elevation view of the trap door in accordance with one or more embodiments of the present invention.
Figure 6D:
FIG. 6D shows a right elevation view of the trap door in accordance with one or more embodiments of the present invention.
Figure 6E:
FIG. 6E shows a front elevation view of the trap door in accordance with one or more embodiments of the present invention.
Figure 6F:
FIG. 6F shows a rear elevation view of the trap door in accordance with one or more embodiments of the present invention.

FIG. 6A shows a top plan view of a trap door for a modular channel member of a modular mud-in channel lighting system (e.g., 100) in accordance with one or more embodiments of the present invention. Continuing, FIG. 6B shows a bottom plan view of trap door 300 in accordance with one or more embodiments of the present invention. Continuing, FIG. 6C shows a left elevation view of trap door 300 in accordance with one or more embodiments of the present invention. Continuing, FIG. 6D shows a right elevation view of trap door 300 in accordance with one or more embodiments of the present invention. Continuing, FIG. 6E shows a front elevation view of trap door 300 in accordance with one or more embodiments of the present invention. Continuing, FIG. 6F shows a rear elevation view of trap door 300 in accordance with one or more embodiments of the present invention.

Figure 7A:
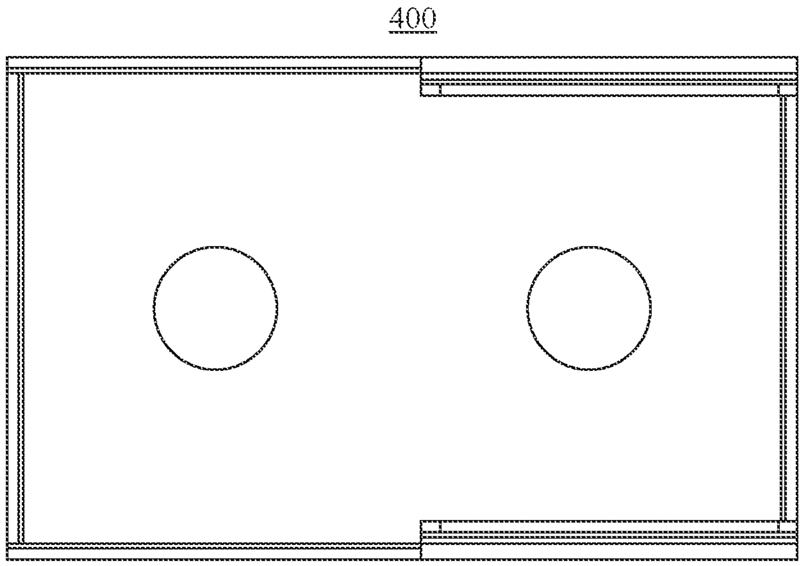
FIG. 7A shows a top plan view of a modular connection box of a modular mud-in channel lighting system in accordance with one or more embodiments of the present invention.
Figure 7B:
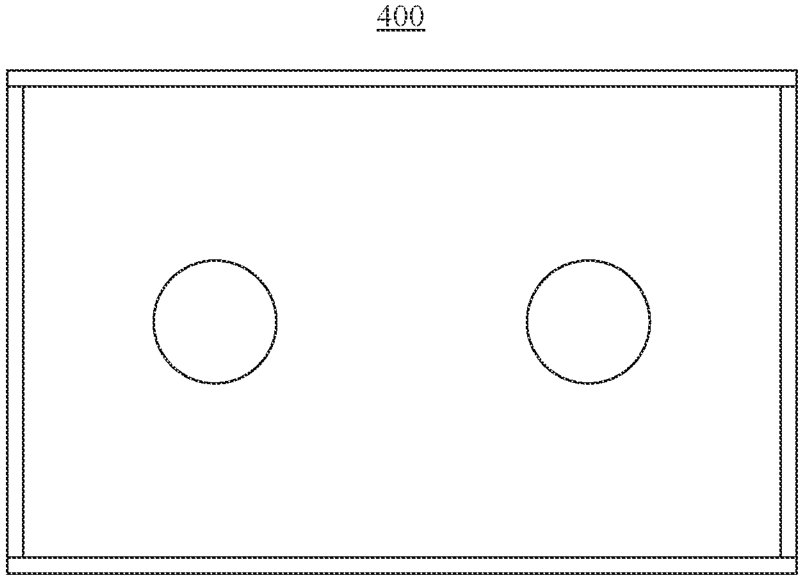
FIG. 7B shows a bottom plan view of the modular connection box in accordance with one or more embodiments of the present invention.
Figure 7C:
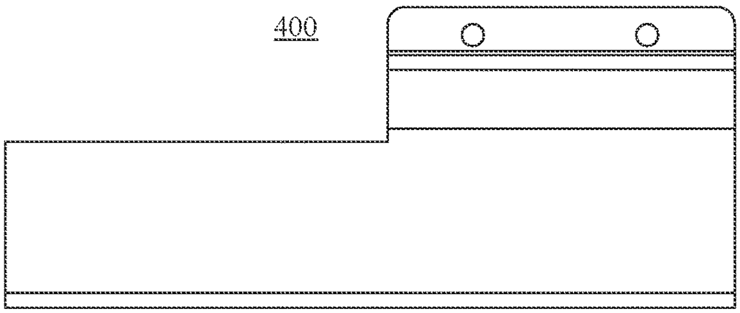
FIG. 7C shows a left elevation view of the modular connection box in accordance with one or more embodiments of the present invention.
Figure 7D:
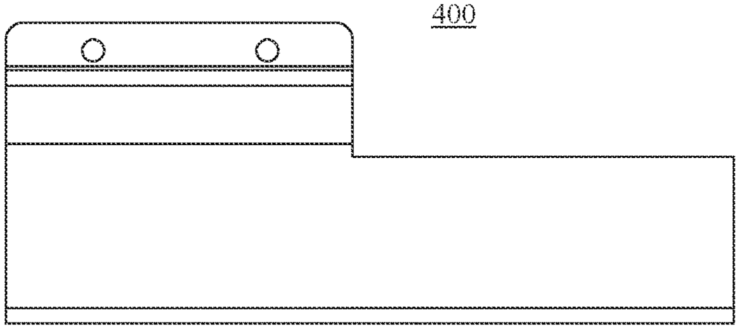
FIG. 7D shows a right elevation view of the modular connection box in accordance with one or more embodiments of the present invention.
Figure 7E:
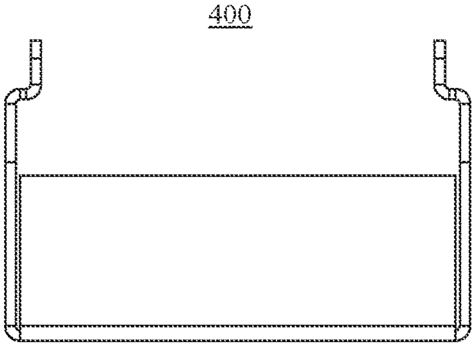
FIG. 7E shows a front elevation view of the modular connection box in accordance with one or more embodiments of the present invention.
Figure 7F:
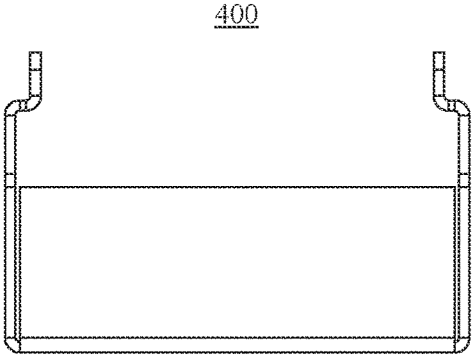
FIG. 7F shows a rear elevation view of the modular connection box in accordance with one or more embodiments of the present invention.

FIG. 7A shows a top plan view of modular connection box 400 of modular mud-in channel lighting system (e.g., 100) in accordance with one or more embodiments of the present invention. Continuing, FIG. 7B shows a bottom plan view of modular connection box 400 in accordance with one or more embodiments of the present invention. Continuing, FIG. 7C shows a left elevation view of the modular connection box 400 in accordance with one or more embodiments of the present invention. Continuing, FIG. 7D shows a right elevation view of the modular connection box 400 in accordance with one or more embodiments of the present invention. Continuing, FIG. 7E shows a front elevation view of the modular connection box 400 in accordance with one or more embodiments of the present invention. Continuing, FIG. 7F shows a rear elevation view of the modular connection box 400 in accordance with one or more embodiments of the present invention.

Figure 8A:
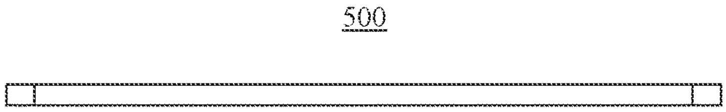
FIG. 8A shows a top plan view of a modular joiner of a modular mud-in channel lighting system in accordance with one or more embodiments of the present invention.
Figure 8B:
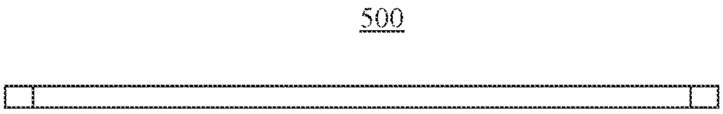
FIG. 8B shows a bottom plan view of the modular joiner in accordance with one or more embodiments of the present invention.
Figure 8C:
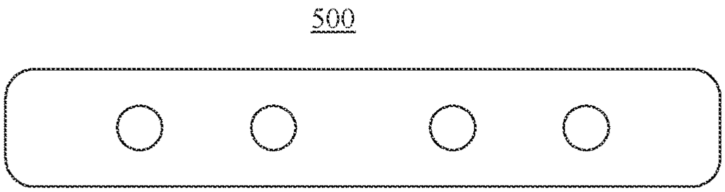
FIG. 8C shows a left elevation view of the modular joiner in accordance with one or more embodiments of the present invention.
Figure 8D:
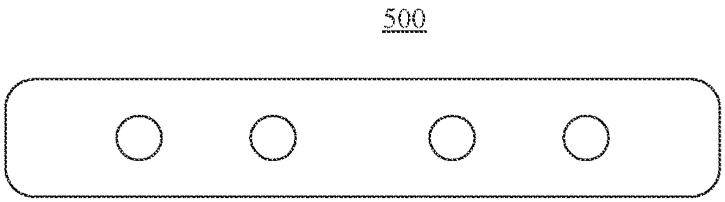
FIG. 8D shows a right elevation view of the modular joiner in accordance with one or more embodiments of the present invention.
Figure 8E:
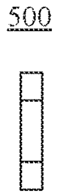
FIG. 8E shows a front elevation view of the modular joiner in accordance with one or more embodiments of the present invention.
Figure 8F:
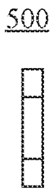
FIG. 8F shows a rear elevation view of the modular joiner in accordance with one or more embodiments of the present invention.

FIG. 8A shows a top plan view of modular joiner 500 of modular mud-in channel lighting system (e.g., 100) in accordance with one or more embodiments of the present invention. Continuing, FIG. 8B shows a bottom plan view of modular joiner 500 in accordance with one or more embodiments of the present invention. Continuing, FIG. 8C shows a left elevation view of modular joiner 500 in accordance with one or more embodiments of the present invention. Continuing, FIG. 8D shows a right elevation view of modular joiner 500 in accordance with one or more embodiments of the present invention. Continuing, FIG. 8E shows a front elevation view of modular joiner 500 in accordance with one or more embodiments of the present invention. Continuing, FIG. 8F shows a rear elevation view of modular joiner 500 in accordance with one or more embodiments of the present invention.

Figure 9A:
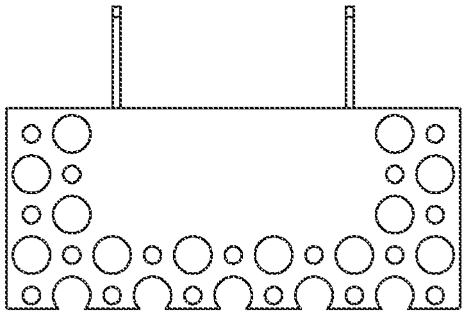
FIG. 9A shows a top plan view of a modular end cap of a modular mud-in channel lighting system in accordance with one or more embodiments of the present invention.
Figure 9B:
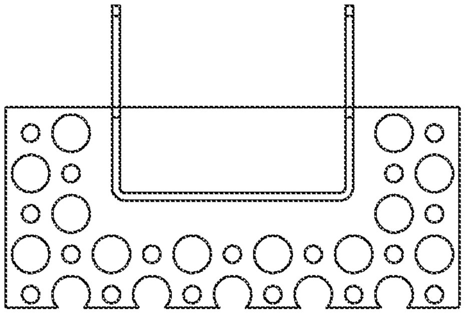
FIG. 9B shows a bottom plan view of the modular end cap in accordance with one or more embodiments of the present invention.
Figure 9C:
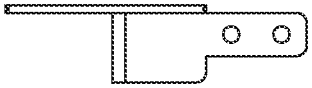
FIG. 9C shows a left elevation view of the modular end cap in accordance with one or more embodiments of the present invention.
Figure 9D:
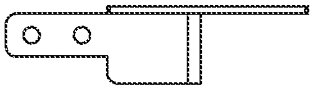
FIG. 9D shows a right elevation view of the modular end cap in accordance with one or more embodiments of the present invention.
Figure 9E:
FIG. 9E shows a front elevation view of the modular end cap in accordance with one or more embodiments of the present invention.
Figure 9F:
FIG. 9F shows a rear elevation view of the modular end cap in accordance with one or more embodiments of the present invention.

FIG. 9A shows a top plan view of modular end cap 600 of a modular mud-in channel lighting system (e.g., 100) in accordance with one or more embodiments of the present invention. Continuing, FIG. 9B shows a bottom plan view of modular end cap 600 in accordance with one or more embodiments of the present invention. Continuing, FIG. 9C shows a left elevation view of modular end cap 600 in accordance with one or more embodiments of the present invention. Continuing, FIG. 9D shows a right elevation view of modular end cap 600 in accordance with one or more embodiments of the present invention. Continuing, FIG. 9E shows a front elevation view of modular end cap 600 in accordance with one or more embodiments of the present invention. Continuing, FIG. 9F shows a rear elevation view of modular end cap 600 in accordance with one or more embodiments of the present invention.

In certain embodiments, modular channel 200, optional trap door 300, modular joiner 500, and modular end cap 600 may be composed of aluminum. While aluminum is light and inexpensive, one of ordinary skill in the art having the benefit of this disclosure will appreciate that other materials may be used in accordance with one or more embodiments of the present invention. In certain embodiments, modular connection box 400 may be composed of steel. Because modular connection box 400 may be used to make electrical connections, modular connection box 400 may be composed of any material suitable for such use in accordance with one or more embodiments of the present invention.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

The invention claimed is:

1. A modular mud-in channel lighting system comprising:

a modular channel comprising a base portion, a first sidewall portion, and a second sidewall portion, wherein the first sidewall portion comprises a first assembly rail and a first mounting wing, and the second sidewall portion comprises a second assembly rail and a second mounting wing; and a modular connection box comprising a base portion having at least one wiring port, a first sidewall portion having a first joiner positioner and a first box joiner, and a second sidewall portion having a second joiner positioner and a second box joiner, wherein the modular connection box is removably attached to a bottom side of the modular channel by sliding the first and the second box joiners of the modular connection box into the first and second assembly rails of the modular channel.

2. The modular mud-in channel lighting system of claim 1, further comprising:

a modular end cap comprising an end cap mounting wing, a first end cap joiner, and a second end cap joiner, wherein the modular end cap is removably attached to the modular channel by sliding the first and the second end cap joiners into the first and second assembly rails of the modular channel.

3. The modular mud-in channel lighting system of claim 1, further comprising:

a second modular channel removably attached to the modular channel, wherein a plurality of modular joiners are at least partially disposed in the first and second assembly rails of the modular channel and at least partially disposed in a first and second assembly rails of the second modular channel.

4. The modular mud-in channel lighting system of claim 1, further comprising:

a second modular end cap comprising an end cap mounting wing, a first end cap joiner, and a second end cap joiner, wherein the second modular end cap is removably attached to the modular channel or a second modular channel by sliding the first and the second end cap joiners into the first and second assembly rails of the modular channel or a first and second assembly rails of the second modular channel.

5. The modular mud-in channel lighting system of claim 1, further comprising:

a strip lighting assembly removably attached to the base portion of the modular channel, wherein a wiring of the strip lighting is removably attached to a wiring routed through the wiring port of the modular connection box inside the modular connection box.

6. The modular mud-in channel lighting system of claim 1, further comprising:

a diffuser removably attached to the modular channel by a first diffuser retention feature disposed on a first sidewall portion of the modular channel and a second diffuser retention feature disposed on a second sidewall portion of the modular channel.

7. The modular mud-in channel lighting system of claim 1, wherein the modular channel further comprises a trap door receiver and a removably attached trap door comprising a feed-through cutout for routing a wiring of strip lighting.

8. The modular mud-in channel lighting system of claim 1, wherein the first and second mounting wings of the modular channel each comprise a plurality of mounting holes.

9. The modular mud-in channel lighting system of claim 1, wherein the first sidewall portion of the modular channel comprises a first mud-in protection feature and the second sidewall portion of the modular channel comprises a second mud-in protection feature.

10. The modular mud-in channel lighting system of claim 1, wherein the first sidewall portion of the modular channel comprises a first diffuser retention feature and the second sidewall portion of the modular channel comprises a second diffuser retention feature.

11. The modular mud-in channel lighting system of claim 2, wherein the end cap mounting wing of the modular end cap comprises a plurality of mounting holes.

12. A method of installing a modular mud-in channel lighting system comprising:

assembling the modular mud-in channel lighting system, wherein the modular mud-in channel lighting system comprises at least one modular channel, at least one modular connection box, and at least one modular end cap;

cutting a rectangular cutout in a drywall structure, wherein the cutout has a width approximately equal to a width of a base portion of the at least one modular connection box and a length approximately equal to a length of the base portion of the at least one modular channel and the length of a support structure of the at least one modular end cap;

skinning a portion of a facing surface sheet of the drywall structure surrounding the cutout, wherein the skinned portion has a width approximately equal to a width of a first mounting wing and a second mounting wing of the at least one modular channel;

securing at least one drywall mounts to a rear surface sheet portion of the drywall structure, wherein the one or more drywall mounts traverse at least the width of the cutout; and disposing the assembled modular mud-in channel lighting system in the cutout, wherein the first mounting wing and second mounting wing of the at least one modular channel is disposed over the skinned portion of the facing surface sheet portion of the drywall structure.

13. The method of claim 12, further comprising:

applying drywall joint tape over the first mounting wing and the second mounting wing of the modular channel and a portion of the drywall structure.

14. The method of claim 13, further comprising:

applying drywall mud over the drywall joint tape.

15. The method of claim 14, further comprising:

painting the drywall structure.

16. The method of claim 15, further comprising:

disposing strip lighting on the base portion of the at least one modular channel.

17. The method of claim 16, further comprising:

routing a wiring through a wiring port of the connection box.

18. The method of claim 12, wherein the assembled modular mud-in channel lighting system is removably attached to the to the one or more drywall mounts by securing screws through the first mounting wing and the second mounting wing of the at least one modular channel and into the at least one drywall mount.

19. The method of claim 12, wherein the cutout may be at any angle relative to one or more studs of the drywall structure.

20. The method of claim 12, wherein the cutout may be disposed at any location without concern as to a location of a fixed junction box to a stud of the drywall structure.

* * * * *